(12) United States Patent
Ogawa

(10) Patent No.: US 7,536,306 B2
(45) Date of Patent: May 19, 2009

(54) PRINT CONTROL METHOD, PRINT CONTROL PROGRAM, AND PRINT CONTROL APPARATUS

(75) Inventor: Katsuhisa Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 816 days.

(21) Appl. No.: 10/252,173

(22) Filed: Sep. 23, 2002

(65) Prior Publication Data

US 2003/0061178 A1 Mar. 27, 2003

(30) Foreign Application Priority Data

Sep. 27, 2001 (JP) ............................. 2001-295713

(51) Int. Cl.
 *G06Q 30/00* (2006.01)
 *G06F 3/12* (2006.01)
(52) U.S. Cl. ........................... 705/1; 705/26; 358/1.15
(58) Field of Classification Search ................... 705/1, 705/26; 358/1.1–1.15
 See application file for complete search history.

(56) References Cited

U.S. PATENT DOCUMENTS

| 5,850,584 | A  | * | 12/1998 | Robinson et al. .............. 399/79 |
| 6,535,294 | B1 | * | 3/2003  | Arledge et al. ............. 358/1.15 |
| 6,687,018 | B1 | * | 2/2004  | Leong et al. ............... 358/1.15 |
| 6,792,485 | B2 | * | 9/2004  | Aoki et al. ..................... 710/65 |
| 6,980,964 | B1 | * | 12/2005 | Cocotis et al. ................ 705/26 |
| 6,982,809 | B2 | * | 1/2006  | Kagaya ....................... 358/1.18 |
| 6,992,786 | B1 | * | 1/2006  | Breding et al. ............. 358/1.15 |
| 7,042,585 | B1 | * | 5/2006  | Whitmarsh et al. ........ 358/1.15 |
| 2002/0026379 | A1 | * | 2/2002 | Chiarabini et al. ............. 705/26 |
| 2002/0046129 | A1 | * | 4/2002 | Nakagawa .................... 705/26 |

(Continued)

FOREIGN PATENT DOCUMENTS

EP 0 782 068 A1 7/1997
EP 0 961 451 A2 12/1999

OTHER PUBLICATIONS

"Hewlett Packard 3: HP Offers Enterprisewide Print Distribution and Management with Enhanced Version of HP OpenView OpenSpool; Scalable Print-Management Software Now Provides Preconfigured Monitoring Capabilities and the Ability to Distribute Print Requests to Multiple Sites", Jun. 13, 1994, Business Wire.*

Business Wire, "Noosh Announces Noosh Direct, Sales Force E-Commerce and Data Exchange; New Tools Meet Print Suppliers' Demand for Collaborative E-Commerce",Sep. 24, 2000, Business Wire.*

*Primary Examiner*—John W Hayes
*Assistant Examiner*—Fadey S Jabr
(74) *Attorney, Agent, or Firm*—Fitzpatrick, Cella, Harper & Scinto

(57) ABSTRACT

The invention provides a mechanism in which in case of using a plurality of print sites, a burden to the user is small and using efficiency is high. According to the invention, there is provided a print control method of forming print orders to print service providers which provide an online print service via the Internet, wherein format information of each of print orders to a plurality of print service providers is managed and, in the case where a print order is received from the user via the Internet, a print order according to the print service provider of an ordering destination is formed on the basis of the format information for the print service provider of the ordering destination of the print order.

6 Claims, 13 Drawing Sheets

U.S. PATENT DOCUMENTS

| | | | |
|---|---|---|---|
| 2002/0063887 A1* | 5/2002 | White | 358/1.15 |
| 2002/0065737 A1* | 5/2002 | Aliabadi et al. | 705/26 |
| 2002/0078130 A1* | 6/2002 | Thornton et al. | 709/201 |
| 2002/0101608 A1* | 8/2002 | Whitmarsh | 358/1.15 |
| 2002/0111876 A1* | 8/2002 | Rudraraju et al. | 705/26 |
| 2002/0123983 A1* | 9/2002 | Riley et al. | 707/1 |
| 2003/0041765 A1* | 3/2003 | Hill | 101/484 |
| 2004/0039647 A1* | 2/2004 | Roche | 705/26 |
| 2004/0185877 A1* | 9/2004 | Asthana et al. | 455/456.6 |
| 2004/0201682 A1* | 10/2004 | Chauvin et al. | 348/207.1 |
| 2006/0041485 A1* | 2/2006 | Tarvydas et al. | 705/26 |
| 2007/0027990 A1* | 2/2007 | Nakaoka et al. | 709/226 |

* cited by examiner

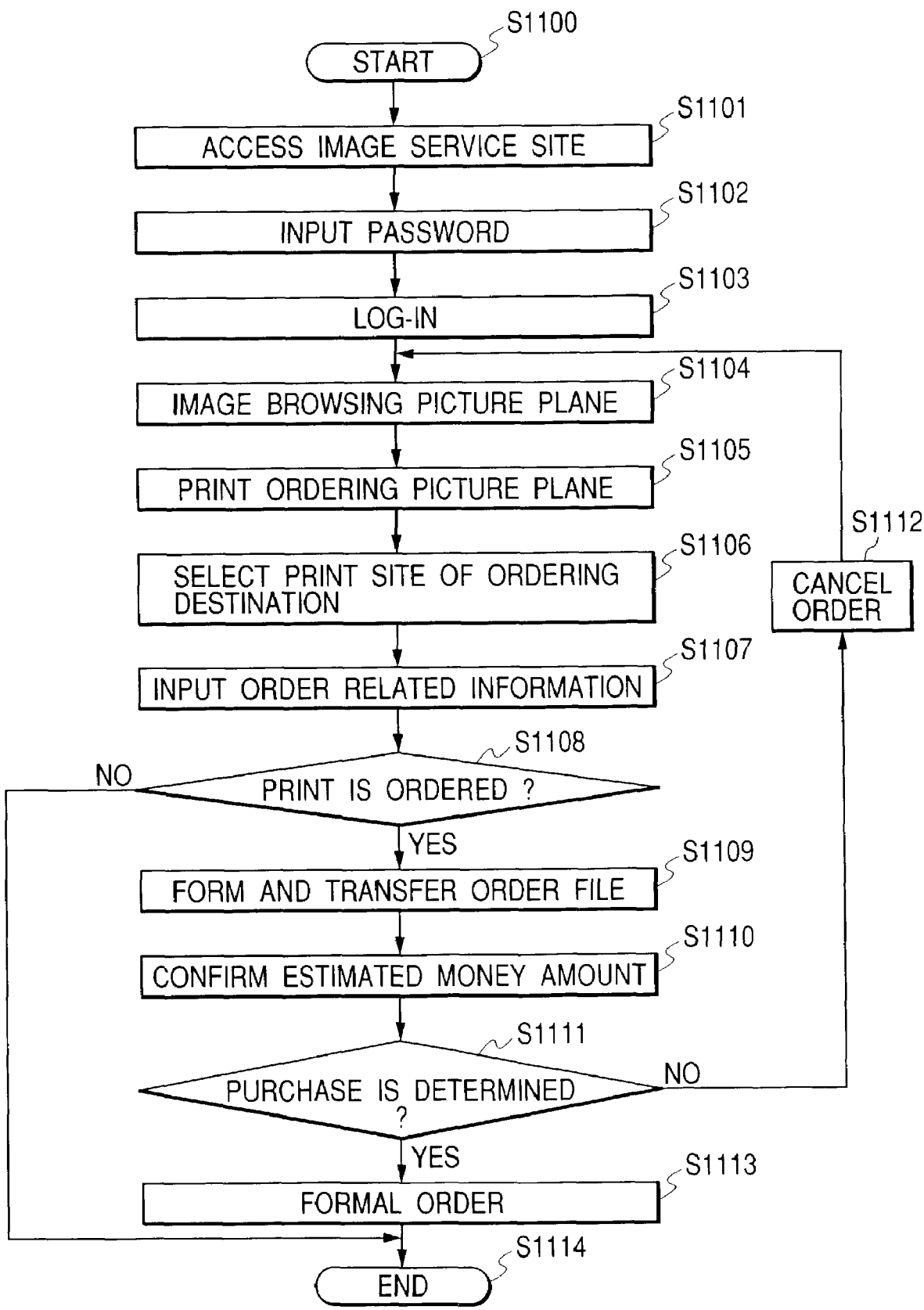

PRINT CONTROL METHOD, PRINT CONTROL PROGRAM, AND PRINT CONTROL APPARATUS

BACKGROUND OF THE INVENTION

1. Field of the Invention

The invention relates to a print control method, a print control apparatus, and a print control program for forming print orders to print service providers which provide an online print service via the Internet.

2. Related Background Art

In recent years, owing to the establishment of communication infrastructure and the development of an information communication technique, an information providing service and an information using service using the Internet can be provided. Particularly, in a multimedia environment in which all data such as text data, image data, audio data, and the like has been digitized, information can be shared and the information can be provided, so that many new information providing services via the Internet have been established. At the same time, a technique for finely patterning a semiconductor device has favorably been improved. Sizes of parts and costs of an LSI and a solid state image pickup device constructing image input apparatuses represented by a digital still camera and a digital video camera have been reduced. Thus, those image input apparatuses have been widespread among customers as electronic apparatuses for photographing an image. Image data photographed by the customer who purchased a digital camera is stored into a memory built in the digital camera, thereafter, generally transferred to a recording apparatus represented by an HDD or the like provided in a personal computer which the customer possesses, managed and stored, or written into an external recording medium such as a CD-R or the like, and stored. In association with the spread of not only the digital camera but also a color scanner, an image can be easily formed and stored as electronic data.

As mentioned above, while the information using and providing services using the communication infrastructure is rapidly increasing due to the realization of multimedia and the rapid development of the Internet, an application service provider (hereinafter, referred to as a photo site) and a print service provider (hereinafter, referred to as a print site) have appeared. That is, the photo site provides a service such that the image data photographed by the customer by using the image input apparatus is held into a memory area of a server on the Internet and the image data can be browsed again when the customer desires. According to the print site, an electronic document such as New Year's card, document made by a word processor, an image, etc. is transferred from the customer by using the Internet, thereby printing printed matter and providing goods.

A service site (hereinafter, referred to as a print site) in which the photo site and the print site are integrated and which has appeared in recent years exists. According to such an image service site, uploading of an image file is received from a client computer via the Internet, the received image file is stored, a thumbnail is formed, and a preview picture plane is formed, thereby enabling the customer to recognize the image file held in the client computer. The image service site permits the image file to be shared (accessed) by a plurality of users in accordance with an instruction from the owner of the held image file. The image service site sets a paper size, a printing method, a print store (hereinafter, referred to as a print shop), and the like into the held image file in accordance with an instruction of a print order from the owner of the held image file or from the user to whom the owner gave permission of a print instruction, and executes a print ordering process of the image to the print shop via the Internet.

However, there is a problem such that the user has to select one of the print shops which are in close association with the image service site as a print output destination of the held image file and a desired print shop (which is not in close association with the image service site) of the user cannot be designated as a print output destination. That is, in order to use a service of making a print order via the Internet by setting the desired print shop of the user to the print output destination (hereinafter, such a service is referred to as an online print service), the user needs to make a print order to the print site or image service site with which the desired print shop is in close association.

However, in each print site or image service site, the services which are handled are different. Specifically speaking, not only a print paper size and resolution but also a T-shirt print, a mug cup print, and the like are largely different in dependence on each image service site. There is, consequently, a problem such that the user has to access the different image service site again and form a print order each time by the online print service which the user wants to use, the user has to recognize which image service site provides which kind of print service, and a burden to the user is large.

There is also a case where it is impossible to set all print orders from a browser on the client computer in dependence on the image service site (print site). In order to use such an image service site, the user has to prepare template information and a dedicated application for issuing the print order to the image service site into a hard disk of the client computer. That is, specification of an order table (for example, including the template information of the print order) at the time of making a print order differs every print site. When the user uses a plurality of print sites, it is necessary to form print order information according to the specification of the order table which is required by each print site and to request the print order. It is necessary to hold the template information (also called format information) for each print site into the computer. Therefore, if an information amount of the template information or dedicated application is large, they cannot be stored in case of a memory capacity of a mobile PC. There is a case where the print order cannot be issued from the mobile PC. It is inconvenient for the user.

There is also a problem such that the user who uses the print services of a plurality of print sites has to learn an order action according to the print order information based on the specification of the template information for each of the plurality of print sites, so that efficiency of the ordering process is remarkably deteriorated.

Further, there is a problem such that in order to use a plurality of print sites, the user needs to perform user registration to each print site, and in the case of accessing the print site via the Internet, the user is generally urged to input a password upon user registration, so that the user has to manage the password to each print site and a burden to the user is large.

SUMMARY OF THE INVENTION

The invention is proposed to solve the problems of the above conventional techniques and it is an object of the invention to provide a mechanism such that in case of using a plurality of print sites, a burden to the user is small and use efficiency is high.

Another object of the invention is to provide a mechanism which can make print orders to a plurality of print sites by accessing one site from a client PC without accessing the plurality of print sites.

It is the first object of the invention to provide a mechanism in a print control method of forming print orders to print service providers which provide an online print service via the Internet, wherein format information of each of print orders to a plurality of print service providers is managed and, in the case where a print order is received from the user via the Internet, a print order according to the print service provider of an ordering destination is formed on the basis of the format information for the print service provider of the ordering destination of the print order.

It is the second object of the invention to provide a mechanism in a print control method of forming print orders to print service providers which provide an online print service via the Internet, wherein user identification information to a plurality of print service providers is managed and, in the case where a print order is received from the user via the Internet, the print service provider of an ordering destination is accessed by using the user identification information of the print service provider of the ordering destination of the print order.

It is the third object of the invention to provide a mechanism in a print control method of forming print orders to print service providers which provide an online print service via the Internet, wherein estimate information of the print orders to a plurality of print service providers is transmitted to an information processing apparatus of the user via the Internet and, in accordance with reception of an instruction showing approval of estimation of the print orders to the plurality of print service providers transmitted from the information processing apparatus of the user, the print orders are issued to the plurality of print service providers.

To accomplish the first object, for example, an information distributing method of the invention comprises the following steps. That is, there is provided a print control method of forming print orders to print service providers which provide an online print service via the Internet, comprising: a managing step of managing format information of each of the print orders to a plurality of print service providers into managing means; a receiving step of receiving a print order from the user via the Internet; a discriminating step of discriminating the print service provider of an ordering destination of the received print order; and an order forming step of obtaining the format information of the discriminated print service provider from the managing means and forming a print order according to the print service provider of the ordering destination on the basis of the obtained format information.

The print control method further has an obtaining step of obtaining information regarding a print shop which can be used by the print service provider, and in the order forming step, a print order in which the print shop selected by the user in accordance with the obtained information is designated as a print destination is formed.

In the format information, a printing method or a paper size which can be designated differs and the number of items to be designated differs every print service provider.

The print control method further includes a transmitting step of transmitting the print order formed in the order forming step to the print service provider of the ordering destination.

To accomplish the second object, for example, an information distributing method of the invention comprises the following steps. That is, there is provided a print control method of forming print orders to print service providers which provide an online print service via the Internet, comprising: a managing step of managing user identification information to each of a plurality of print service providers into managing means; a receiving step of receiving a print order from the user via the Internet; a discriminating step of discriminating the print service provider of an ordering destination of the received print order; and a step of obtaining the user identification information of the discriminated print service provider from the managing means and accessing the print service provider of the ordering destination by using the obtained user identification information.

In the managing step, format information of each of the print orders to the plurality of print service providers is managed in the managing means, and the print control method further has: an obtaining step of obtaining information regarding a print shop which can be used by the print service provider; and an order forming step of obtaining the format information of the discriminated print service provider from the managing means and forming a print order in accordance with the print service provider of the ordering destination on the basis of the obtained format information, that is, the print order in which the print shop selected by the user in accordance with the obtained information is designated as a print destination.

The user identification information is a user ID and a password and differs every print service provider.

The print control method further has a transmitting step of transmitting the print order formed in the order forming step to the print service provider of the ordering destination.

To accomplish the third object, for example, an information distributing method of the invention comprises the following steps. That is, there is provided a print control method of forming print orders to print service providers which provide an online print service via the Internet, comprising: a receiving step of receiving the print orders to a plurality of print service providers from an information processing apparatus of the user via the Internet; a transmitting step of transmitting estimate information of the print orders for the plurality of print service providers to the information processing apparatus of the user via the Internet; and an order issuing step of issuing the print orders to the plurality of print service providers in accordance with reception of an instruction showing approval of estimation of the print orders to the plurality of print service providers transmitted from the information processing apparatus of the user.

The print control method further includes: a managing step of managing format information of each of the print orders to the plurality of print service providers into managing means; a discriminating step of discriminating the print service provider of an ordering destination of the received print order; and an order forming step of obtaining the format information of the discriminated print service provider from the managing means and forming a print order according to the print service provider of the ordering destination on the basis of the obtained format information.

The estimate information which is transmitted in the transmitting step is information including a list of estimation for the plurality of print service providers or a value obtained by summing up the estimation.

The print control method further includes a transmitting step of transmitting the print order formed in the forming step to the print service provider of the ordering destination.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a flowchart which is controlled by a user PC of a print ordering process in another embodiment of the invention.

DETAILED DESCRIPTION OF THE PREFERRED EMBODIMENTS

Figure 1:
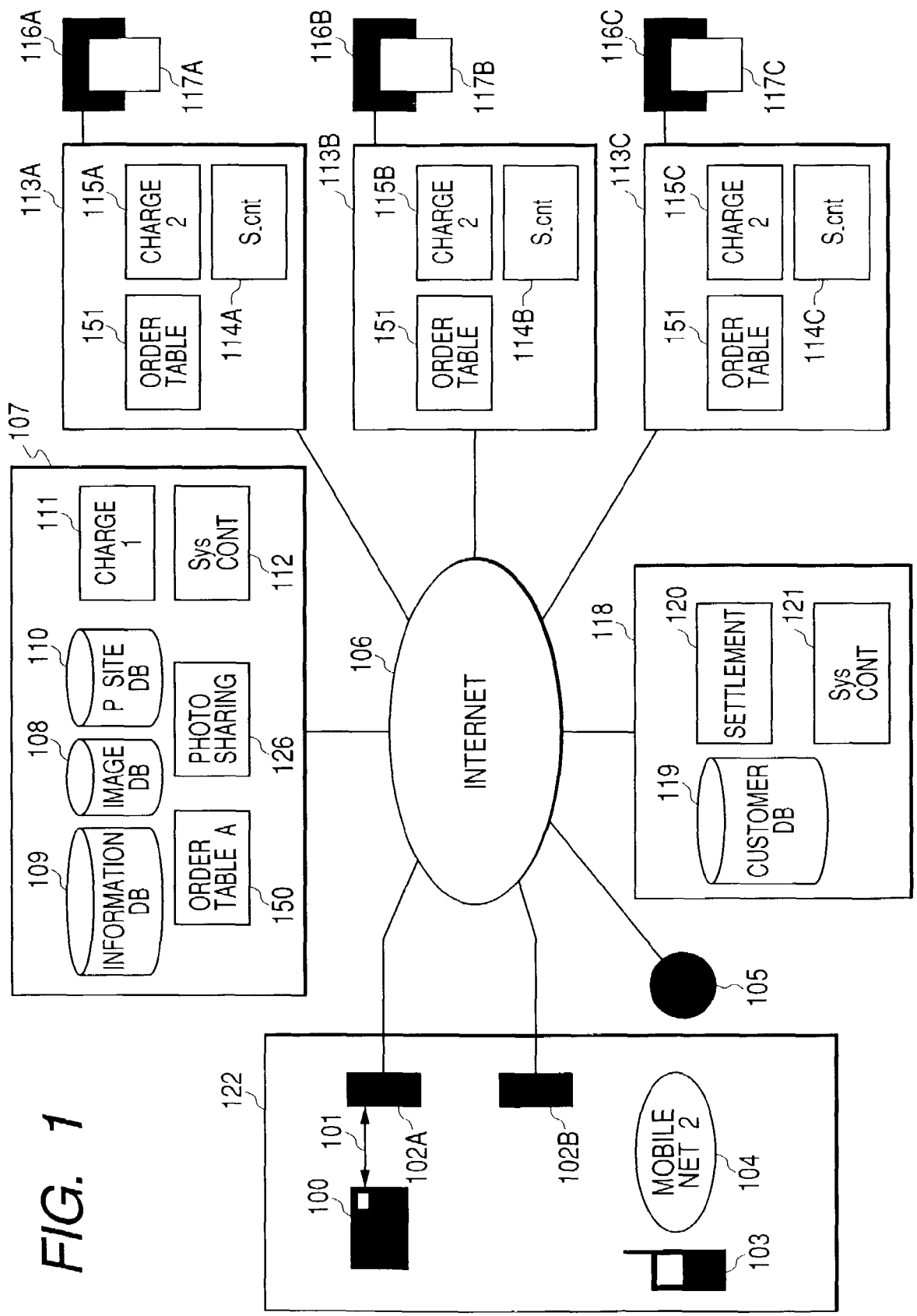
FIG. 1 is a block diagram showing a system construction in an embodiment of the invention.

Embodiments which are preferable in a print system of the invention will be described hereinbelow with reference to the drawings. FIG. 1 is a block diagram constructing the system in the first embodiment.

Reference numeral 100 denotes an image input apparatus corresponding to a digital still camera which can photograph a still image and record it as image data, a digital video camera which can photograph a motion image and record it as motion image data, and the like. That is, the image input apparatus 100 is an apparatus for converting an optical image as image information into an electric signal, executing predetermined image processes, and thereafter recording and reproducing it as digital information. Reference numeral 102A denotes a personal computer for the user (hereinafter, abbreviated to a user PC or a client PC) as an information processing apparatus of the invention. Reference numeral 101 denotes a data transfer interface for transferring the photographed image data between the image input apparatus 100 and the user PC 102A. As a data transfer interface 101, it is possible to use a wire interface represented by USB or IEEE1394 or a wireless interface represented by IrDA or Bluetooth. In the embodiment, its kind is not limited. The image data photographed by the image input apparatus 100 and stored as digital information is transferred via the data transfer interface 101 to a memory area of an information storing apparatus represented by an HDD of the user PC 102A. With respect to the transfer of the image data from the image input apparatus 100 to the user PC 102A, there are a case where the image data stored in the information storing apparatus provided in the image input apparatus 100 is transferred in the lump by a command from an OS or dedicated software installed in the user PC 102A and a case where the OS or dedicated software in the user PC 102A assures a data recording area into an information recording portion of the user PC 102A and transfers the image data by a transfer command which is sent from the image input apparatus 100.

The image data transferred to the user PC 102A as mentioned above is uploaded into an image service site 107 as a preferred embodiment of a print control apparatus of the invention connected to an Internet 106 by the following procedure. Unlike the conventional image service site, the image service site 107 as a print control apparatus of the invention can provide an online print service for another print service provider (hereinafter, referred to as a print site) to the client user. Further, the image service site 107 not only becomes a window for one print site but also provides an environment where the user can use online print services for a plurality of different print sites via the image service site of the invention. Details regarding the image service site of the invention will be explained hereinlater. A browser (corresponding to "Internet Explorer" of Microsoft Corporation in U.S.A. or "Netscape" of Netscape Communications in U.S.A.) having a standard protocol which can transfer information on the Internet 106 which operates on the user PC 102A accesses the image service site 107 by using a standard protocol such as an http protocol or the like, obtains Web information linked with multimedia information such as image, audio sound, etc. formed by a description language such as HTML, XML, or the like which is managed by the server PC of the image service site 107, and displays it onto a display unit of the user PC 102A. By this operation, the user PC 102A can receive the services using the Internet 106 as a communication infrastructure which is provided by the image service site 107.

Subsequently, the image data photographed by the image input apparatus 100 and stored in the information storing area of the user PC 102A is transferred to the image service site 107 in response to a request from the user of the user PC 102A (hereinafter, this transfer is called an image upload). As an image upload, there are a case where the user is allowed to select image data to be transferred and the selected image data is transferred from the foregoing browser in an interlocking relational manner with a requesting action of the image upload and a case where the image data is selected by using dedicated software for image uploading or the like and the image data is directly transferred from the dedicated software for image uploading mentioned above. In both cases, the image upload is executed on the basis of a protocol which can be used on the Internet such as http or ftp. A module which executes the series of operations by the image service site 107 is a photosharing module 126.

In the photosharing module 126, whether the uploaded image data is data which can be used by the image service site 107 or not is discriminated. If it is determined that the image data can be used, the uploaded image data is stored into an image database 108 and its attribute information is stored into an information database 109. At this stage, the photosharing module 126 notifies the user PC 102A of a fact that the image data has normally been uploaded.

Besides the attribute information of the image data described above, data of the attribute information of the customer registered in the image service site 107 and various data such as attribute information and the like of the print service provider (print site) which is requested to print out the uploaded image data are unitarily managed in the information database 109. From the image data uploaded in this manner, the user of the user PC 102A can browse a designated image via a Web browser. With respect to the browsing, there is also a case where the uploaded image data is managed as an album by setting a plurality of images to one unit.

A flow of the print order of the uploaded image data and order information conversion of the print order as a maximum feature of the invention will now be sequentially described. In the image data uploaded in the image service site 107, the user of the user PC 102A can browse the image data uploaded by himself via the Web browser. At this time, as means for selecting the image to be browsed, there are a case where images to be successively browsed are selected on a single image unit basis and a case where a plurality of images are registered as one album, the album which the user himself wants to browse is selected from a plurality of album groups and each image managed by the selected album is selected and browsed.

The image service site 107 requests a print order of the image data uploaded from the user PC from the print sites (print service providers) which provide the print-out of the image data as a solution. Those print service providers are print sites 113A, 113B, and 113C. Although three print sites are shown for the purpose of simplifying the drawing, there is a case where four or more print sites are used and the number of print sites is not limited. From a browsing picture plane of the uploaded image, the user of the user PC 102A selects the image data which he wants to print out and get as a product. Subsequently, the customer of the user PC 102A selects the print site to which a print order is made. With respect to the selection of the print site, there are a case where the customer of the user PC 102A selects a desired print site by himself and a case where the image service site 107 provides the optimum print site from the attribute information of each customer by default. To explain an order information converting function as a maximum feature of the invention, a case where the print order is requested to the two print sites 113A and 113B in FIG. 1 will be described.

In case of making a print order to the print site 113A so as to print the selected browsing image, first, the customer of the user PC 102A requests the customer to input information necessary for the print order in accordance with a specification of an order table A 150 for the print order which is provided by the image service site 107. After the customer inputted all information, print order information according to the specification of the order table A 150 is transferred from the user PC 102A to the image service site 107 by using the standard protocol such as an http protocol or the like. In the image service site 107, after the print order information (also called a common print order) is received, it is analyzed by a system controller 112, and the print site 113A as an ordering destination reads out information of a print order format at the time of receiving the print order from the order table 150. The system controller 112 reads out attribute information of a plurality of print sites from which a print order service solution is provided, that is, reads out a kind of online print service of the print site of the ordering destination and shop information (place and price) of the print shop of the print destination from a print site database 110 in which the attribute information has been stored. The system controller 112 converts the common print order received from the user PC into the print order information (also called a print order for provider) according to the specification of template information (format information) of the print order to the print site of the ordering destination managed in the order table 150. At this stage, the image service site 107 forms a temporary print order regarding the image data to which the print order has been requested and requests the print site 113A to estimate via the Internet 106.

The print site 113A which received the temporary print order from the image service site 107 calculates a price from contents of the temporary print order by a charge-2 module 115A as charging means and notifies the image service site 107 of an estimated price via the Internet 106.

The image service site 107 receives information of the estimated price from the print site in a realtime manner and transfers it as Web information (picture plane information which can be displayed by the Web browser) to the user PC 102A, so that the total estimated price can be dynamically presented to the user who makes the print order. A module of the system controller 112 executes the above series of controls. When the user of the user PC 102A who print-ordered admits purchase of the presented price and returns an action of approval to the image service site 107, the system controller 112 receives it, forms formal print order information according to the specification of an order table B 151, transmits it to the print site 113A, and requests a settlement proxy site 118 to execute a proxy process of a settling process.

The print site 113A receives the formal print order and obtains the image data necessary to print out from the image database 108 of the image service site 107 by using the standard protocol such as http, ftp, or the like. The image data obtained in this manner is printed out and outputted as printed matter 117A by using printing means 116A which the print site 113A possesses. The printed matter 117A which was printed out is delivered to a delivery destination designated by the customer of the user PC 102A who requested the print-out by some conveying means. As mentioned above, since the print site is generally in close association with a plurality of print stores (hereinafter, referred to as print shops), it is also possible that the print site transfers the print order to a desired print shop of the user and the image data is printed by a printing apparatus at the print shop. This is because by permitting the print at the print shop, it is convenient in the case where the user wants to take the printed matter at the shop.

The settlement proxy site 118 executes the settling process on the basis of a settlement proxy request from the image service site 107. A system controller 121 extracts customer attribute information from the customer attribute information and information such as price and the like necessary for the settling process which are sent from the image service site 107. The customer attribute information of the user PC 102A is referred to from a customer database 119 and an approving process regarding the customer and which is necessary for the settling process is finished. After completion of the approving process, a settlement module 120 executes the settling process.

In the case where the customer of the user PC 102A print-orders the selected browsing image to the print site 113B, in a manner similar to the above, first, the Web browser or the dedicated application requests the customer to input the information necessary for the print order in accordance with the specification of the order table A 150 for the print order which is provided by the image service site 107. After the customer inputted all information, the Web browser or the dedicated application transfers print order information according to the specification of the order table A 150 from the user PC 102A to the image service site 107 via the Internet 106 by using the standard protocol such as an http protocol or the like.

In the image service site 107, after the print order information (also called a common print order) was received from the user PC, it is analyzed by the system controller 112, thereby discriminating the print site of the ordering destination shown by the print order information. The system controller 112 reads out information of a print order format at the time when the print site 113B as an ordering destination receives the print order from the order table 150. The system controller 112 reads out the attribute information of a plurality of print sites from which the print order service solution has been provided from the print site database 110 in which the attribute information has been stored. The system controller 112 converts the common print order received from the user PC into the print order information (also called a print order for provider) according to each print site in accordance with the specification of the template information (format information) of the print order read out from the order table 150. At this stage, the image service site 107 forms the temporary print order regarding the image data to which the print order has been requested and requests the print site 113B to estimate via the Internet 106. Since the print order for provider which is formed at this stage is called a temporary print order because the approval is not formally obtained from the customer yet. Although the print order for provider becomes a formal print order for the first time at a stage when the approval is obtained from the customer as will be explained hereinlater, data formats and the like of the temporary print order and the formal print order are the same.

The print site 113B which received the temporary print order from the image service site 107 calculates a price from contents of the temporary print order by a charge-2 module 115B as charging means and notifies the image service site 107 of the estimated price via the Internet 106.

The image service site 107 receives information of the estimated price from the print site in a realtime manner and transfers it as Web information to the user PC 102A, so that the total estimated price can be dynamically presented to the user who makes the print order. A module of the system controller 112 executes the above series of controls. When the user of the user PC 102A admits purchase by the presented price and returns an action of approval to the image service site 107, the system controller 112 receives it and transmits it to the print site of the print ordering destination by setting the temporary print order information which has already been formed to formal print order information. The system controller 112 can also form the formal print order information according to the specification of the order table 150 and transmit it to the print site 113B. When the formal print order information is transmitted to the print site, the image service site 107 requests the settlement proxy site 118 to execute the proxy process of the settling process.

The print site 113B receives the formal print order from the image service site 107 and obtains the image data (image contents) necessary to print out from the image database 108 of the image service site 107 by using the standard protocol such as http, ftp, or the like. The print site can also allow image contents and print setting (the number of copies, paper size, etc.) to be included in the formal print order instead of receiving the image contents separately from the formal print order. The image data obtained in this manner is printed out and outputted as printed matter 117B by using printing means 116B which the print site 113B possesses. The printed matter 117B which was printed out is delivered to a delivery destination designated by the customer of the user PC 102A who requested the printout by some conveying means. The settlement proxy site 118 executes the settling process on the basis of a settlement proxy request from the image service site 107. The system controller 121 extracts the customer attribute information from the customer attribute information and information such as price and the like necessary for the settling process which are sent from the image service site 107. The customer attribute information of the user PC 102A is referred to from the customer database 119 and the approving process regarding the customer and necessary for the settling process is finished. After completion of the approving process, a settlement module 120 executes the settling process.

Also in the case where the customer of the user PC 102A uses the online print service of the print site 113C, since processes which are executed via the image service site 107 are similar, their descriptions are omitted here.

Figure 2:
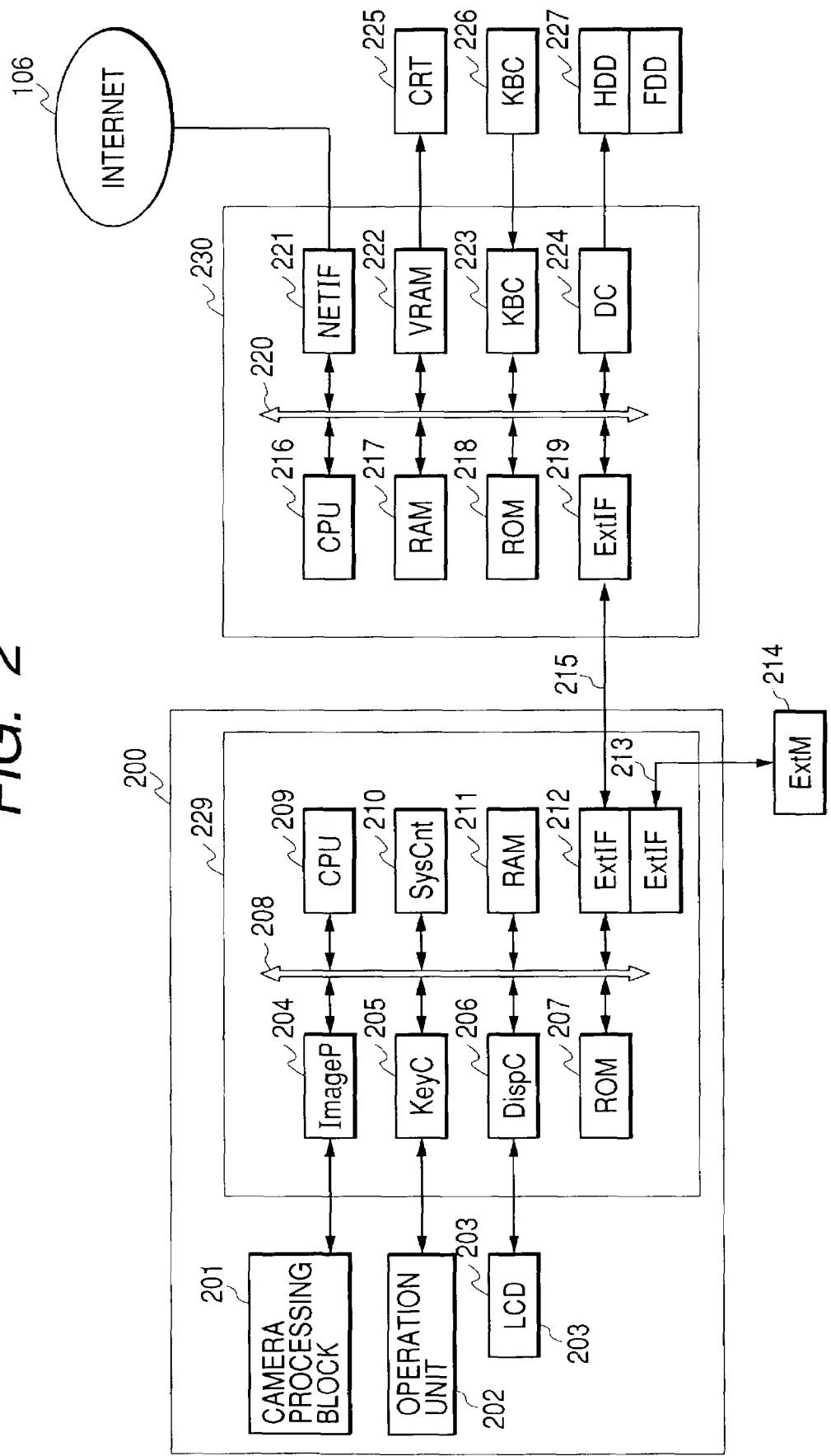
FIG. 2 is a constructional diagram of hardware of a user PC in the embodiment of the invention.

FIG. 2 is a constructional diagram of hardware of the user PC in the embodiment suitable for the information processing apparatus of the invention. Reference numeral 230 corresponds to the user PC 102A. Reference numeral 216 denotes a CPU for controlling the whole user PC apparatus. The CPU 216 can provide various functions by executing an arithmetic operating process on the basis of a control program stored in storing means such as RAM 217, ROM 218, HDD 227, or the like. Reference numeral 220 denotes a common bus line of a signal which is necessary for each unit in the user PC 230. Reference numeral 217 denotes the RAM which functions as a main memory of the CPU 216 and a work area or a temporary standby area of an execution program. Reference numeral 218 denotes the ROM in which an operation processing procedure of the CPU 216 has been stored. A system program for controlling the functions of the user PC 230, a program shown by a processing flow, which will be explained hereinlater, and data necessary for making the system operative have been recorded in the ROM 218.

Reference numeral 221 denotes a network interface. The system accesses the Internet 106 via the interface 221 and executes a communicating process such as data transfer or the like to/from a server PC of each of the image service site, print site, and settlement proxy site. Reference numeral 222 denotes a video RAM. An image which is displayed on a CRT 225 for displaying an operation mode of the user PC 230 is developed in the video RAM 222 and its display control is made. Reference numeral 223 denotes a keyboard controller for controlling an input signal from an external input apparatus such as a keyboard or the like. Reference numeral 226 denotes an external input apparatus for receiving the operation. Generally, the keyboard or a pointing device is shown as an external input apparatus 226. Reference numeral 224 denotes a disk controller for controlling the removable disk 227 such as hard disk, floppy disk, or the like. Reference numeral 219 denotes an interface unit for transferring data to/from an external apparatus. In the diagram, an image input apparatus such as digital camera, digital video, or the like which is necessary for transferring the data to the image service site is connected to the interface unit 219.

The print control program of the invention, an order template for the image service site which is used in the print order, and the service information have been stored on the HDD 227. They are read out and stored into the RAM 217 as necessary and controlled by the CPU 216.

Reference numeral 200 corresponds to the image input apparatus 100; 201 denotes a camera processing block for photographing an optical image of an object to be photographed and converting it into an electric signal; 202 an operation unit having a shutter or a key for the menu operation; and 203 a monitor such as a liquid crystal display LCD or the like for displaying the photographed image data and outputting characters or the like necessary for the menu operation. Reference numeral 204 denotes an image processor. A signal obtained by simply converting a photographed image from the camera processing block 201 into an electric signal is image-processed by the image processor 204 and converted into a high quality image having high brilliance. Reference numeral 205 denotes a key controller which receives an instruction from the key connected to the operation unit 202 and transfers it to a signal common bus 208; 229 a signal processor main body unit; 209 a CPU for controlling a whole sequence of the image input apparatus 200; and 210 a system controller of the image input apparatus 100. The system controller 210 supports the control of the CPU 209 and supports the function controls of the image processor 204 and camera processing block 201. Reference numeral 211 denotes an RAM serving as a memory space for temporarily storing the photographed image data or the like, and 207 an ROM in which a basic program for controlling the image input apparatus 200 has been stored.

Reference numeral 212 denotes an output interface having a function for transferring the photographed image data to an external apparatus and a function for receiving image data and a control program from an external apparatus. Reference numeral 214 denotes a memory for external storage which receives the image data photographed by the image input apparatus 200 from the output interface 212 via a signal line 213 and stores and holds it. Reference numeral 215 denotes a signal line (corresponding to the data transfer interface 101 in FIG. 1) for connecting the image input apparatus 200 to the user PC 230. The image data photographed by the image input apparatus 200 is transferred to the user PC 230 via the signal line 215.

Figure 3:
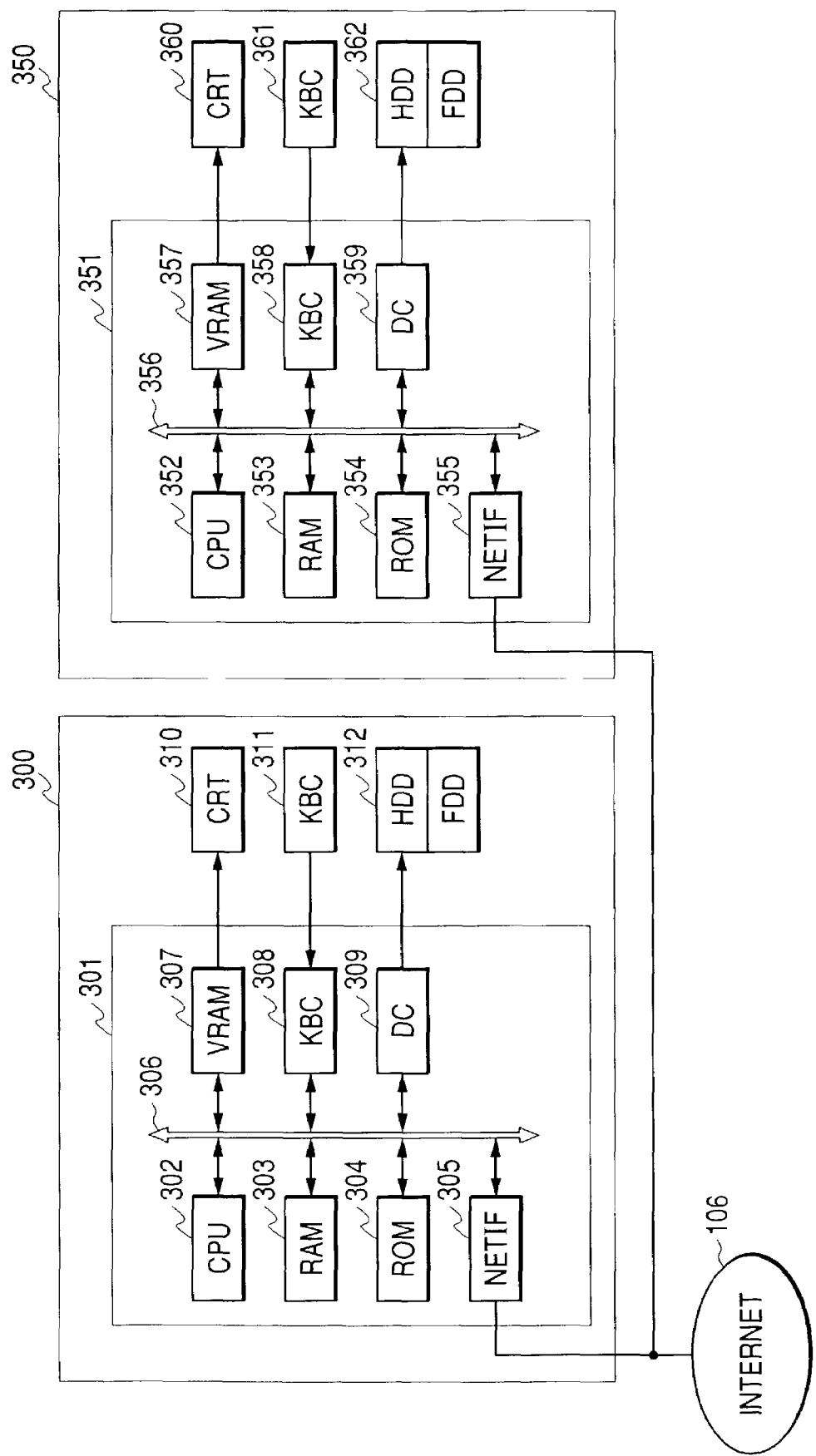
FIG. 3 is a constructional diagram of a server PC of an image service site and a server PC of settlement proxy site in the embodiment of the invention.

FIG. 3 is a hardware constructional diagram of a server PC 300 of the image service site 107 and a server PC 350 of the settlement proxy site 118 in the first embodiment of the invention.

Reference numeral 300 denotes the server PC (corresponding to the substance of the print control apparatus of the invention) of the image service site and 302 indicates a CPU for controlling the whole apparatus. The CPU 302 can provide various functions by executing an arithmetic operating process on the basis of a control program stored in the storing means. Reference numeral 306 denotes a common bus line of a signal which is necessary for each unit in the server PC 300. Reference numeral 303 denotes an RAM which functions as a main memory of the CPU 302 and a work area or a temporary standby area of an execution program. Reference numeral 304 denotes an ROM in which an operation processing procedure of the CPU 302 has been stored. A system program for controlling the functions of the client PC 300, a program shown by a processing flow, which will be explained hereinlater, and data necessary for making the system operative have been recorded in the ROM 304.

Reference numeral 305 denotes a network interface. The system accesses the Internet 106 via the interface 305 and executes a communicating process such as data transfer or the like to/from the user PC and a server PC of each of the print site and the settlement proxy site. Reference numeral 307 denotes a video RAM. An image which is displayed on a CRT 310 for displaying an operation mode of the server PC 300 is developed in the video RAM 307 and its display control is made. Reference numeral 308 denotes a keyboard controller for controlling an input signal from the external input apparatus such as a keyboard or the like. Reference numeral 311 denotes an external input apparatus for receiving the operation. Generally, the keyboard or a pointing device is shown as an external input apparatus 311. Reference numeral 309 denotes a disk controller for controlling a removable disk 312 such as hard disk, floppy disk, or the like.

The print control program in the image service site of the invention, order tables of a plurality of print sites which are used in the print order, the service information, the customer information, and the image data have been stored on the HDD 312. They are read out and stored into the RAM 303 as necessary and controlled by the CPU 302.

Reference numeral 350 denotes the settlement proxy site server PC and 352 indicates a CPU for controlling the whole apparatus. The CPU 352 can provide various functions by executing an arithmetic operating process on the basis of the control program stored in the storing means. Reference numeral 356 denotes a common bus line of a signal which is necessary for each unit in the settlement proxy site server PC 350. Reference numeral 353 denotes an RAM which functions as a main memory of the CPU 352 and a work area or a temporary standby area of an execution program. Reference numeral 354 denotes an ROM in which an operation processing procedure of the CPU 352 has been stored. A system program for controlling the functions of the settlement proxy site server PC 350, a program shown by a processing flow, which will be explained hereinlater, and data necessary for making the system operative have been recorded in the ROM 354.

Reference numeral 355 denotes a network interface. The system accesses the Internet 106 via the interface 355 and executes a communicating process such as data transfer or the like to/from the user PC and a server PC of each of the print site and the image service site. Reference numeral 357 denotes a video RAM. An image which is displayed on a CRT 360 for displaying an operation mode of the settlement proxy site server PC 350 is developed in the video RAM 357 and its display control is made. Reference numeral 358 denotes a keyboard controller for controlling the input signal from the external input apparatus such as a keyboard or the like. Reference numeral 361 denotes an external input apparatus for receiving the operation. Generally, the keyboard or a pointing device is shown as an external input apparatus 361. Reference numeral 359 denotes a disk controller for controlling a removable disk 362 such as hard disk, floppy disk, or the like. The customer attribute information necessary for the control or settling process in the settlement proxy site, the service information, and the like have been stored on the removable disk.

Figure 4:
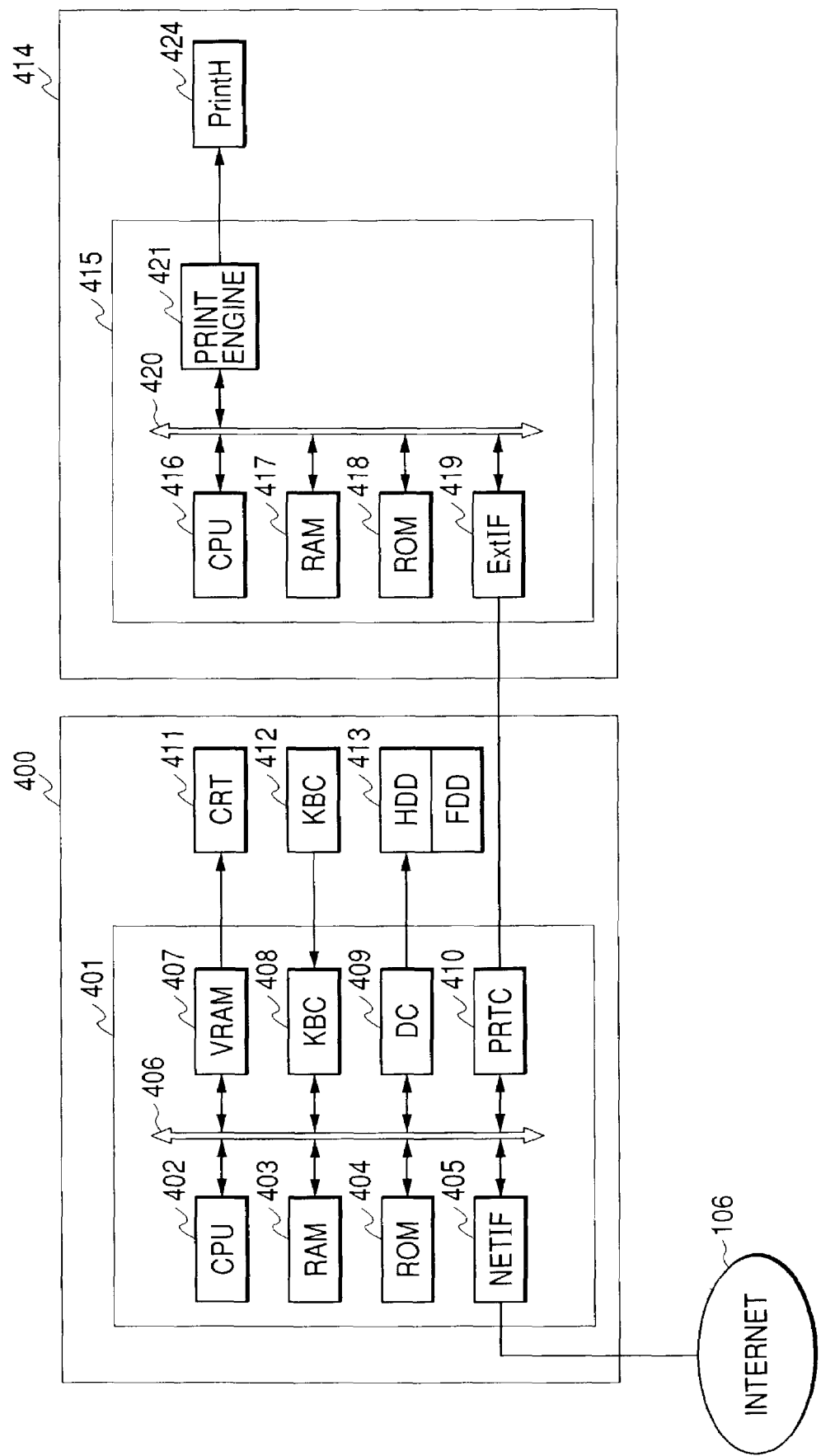
FIG. 4 is a constructional diagram of hardware of a print site server PC in the embodiment of the invention.

FIG. 4 is a constructional diagram of hardware of a server PC of a print site 113 in the embodiment of the invention.

Reference numeral 400 denotes a server PC of the print site 113 and 402 indicates a CPU for controlling the whole apparatus. The CPU 402 can provide various functions by executing an arithmetic operating process on the basis of the control program stored in the storing means. Reference numeral 406 denotes a common bus line of a signal which is necessary for each unit in the print site PC 400. Reference numeral 403 denotes an RAM which functions as a main memory of the CPU 402 and a work area or a temporary standby area of an execution program. Reference numeral 404 denotes an ROM in which an operation processing procedure of the CPU 402 has been stored. A system program for controlling the functions of the print site PC 400, a program shown by a processing flow, which will be explained hereinlater, and data necessary for making the system operative have been recorded in the ROM 404.

Reference numeral 405 denotes a network interface. The system accesses the Internet 106 via the interface 405 and executes a communicating process such as data transfer or the like to/from the user PC and a computer of each of the image service site and the settlement proxy site. Reference numeral 407 denotes a video RAM. An image which is displayed on a CRT 411 for displaying an operation mode of the print site PC 400 is developed in the video RAM 407 and its display control is made. Reference numeral 408 denotes a keyboard controller for controlling the input signal from the external input apparatus such as a keyboard or the like. Reference numeral 412 denotes an external input apparatus for receiving the operation. Generally, the keyboard or a pointing device is shown as an external input apparatus 412. Reference numeral 409 denotes a disk controller for controlling a removable disk 413 such as hard disk, floppy disk, or the like. The control program in the print site, the order table which is used in the print order, and the service information have been stored on the HDD 413 and they are read out and stored into the RAM 403 as necessary and controlled by the CPU 402. Reference numeral 410 denotes a print controller for sending print data into a printing apparatus 414 and controlling the print. The printing apparatus 414 receives the print data from the print site PC 400 via an external interface 419 and executes a printing process. Reference numeral 416 denotes a CPU for managing a whole process of the printing apparatus 414; 417 an RAM; 418 an ROM in which a program necessary for the print control that is used by the CPU has been stored; 420 a signal common bus; 415 a print processing unit for controlling the printing process; and 421 a print processing engine for rasterizing data to be actually printed by a print head 424 and driving the print head 424.

As mentioned above, in the case where the print site 113 allows the print shop which is in close association with the online print service to execute the printing process, the server PC 400 of the print site 113 transfers a formal print order to the print shop via the network interface 405. The print shop executes the printing process on the basis of the received formal print order in a manner similar to the foregoing print site.

Figure 5:
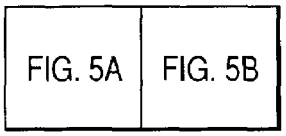
FIG. 5 which is composed of FIGS. 5A and 5B are functional module diagrams in the embodiment of the invention.
Figure 5A:
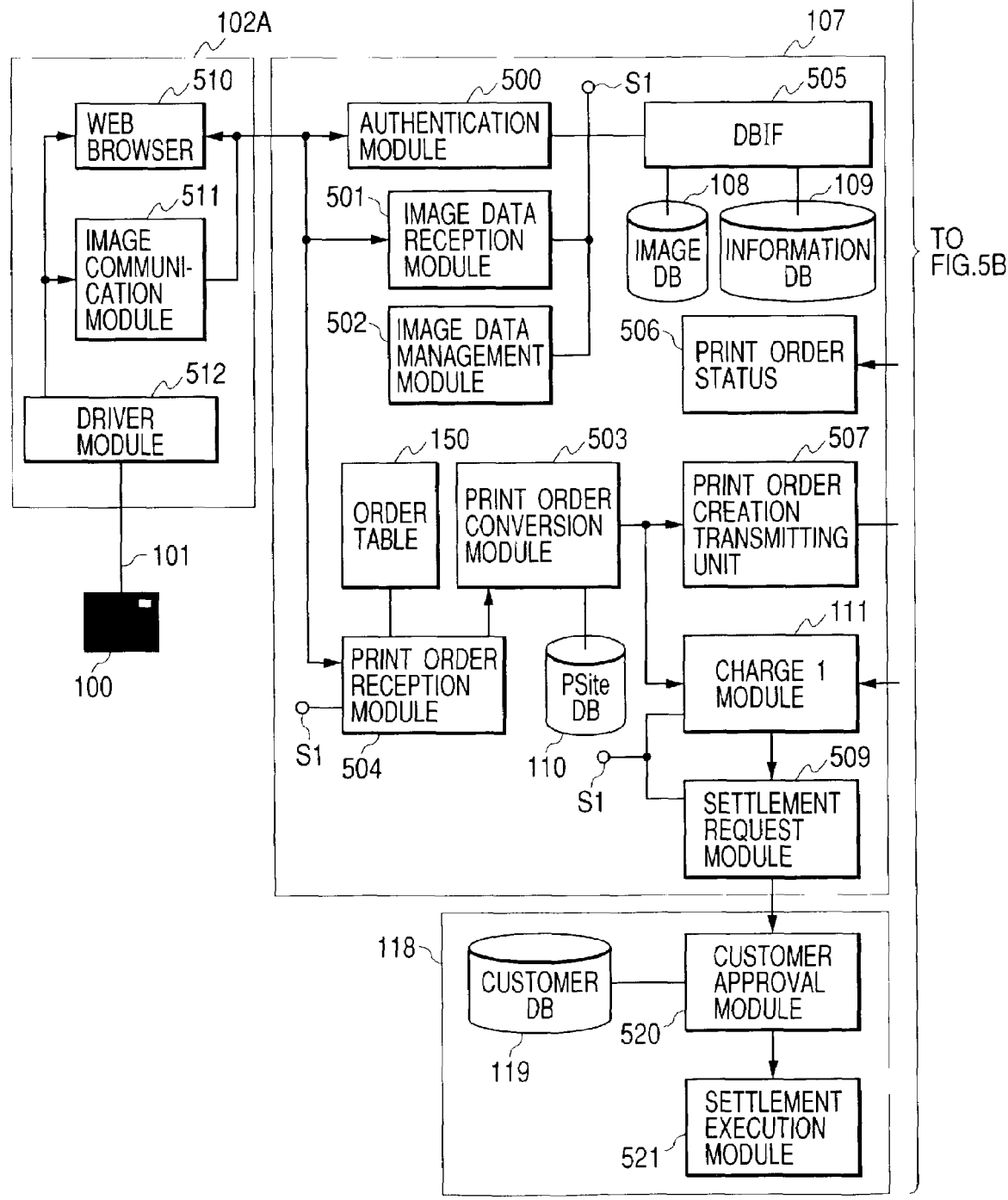
Figure 5B:
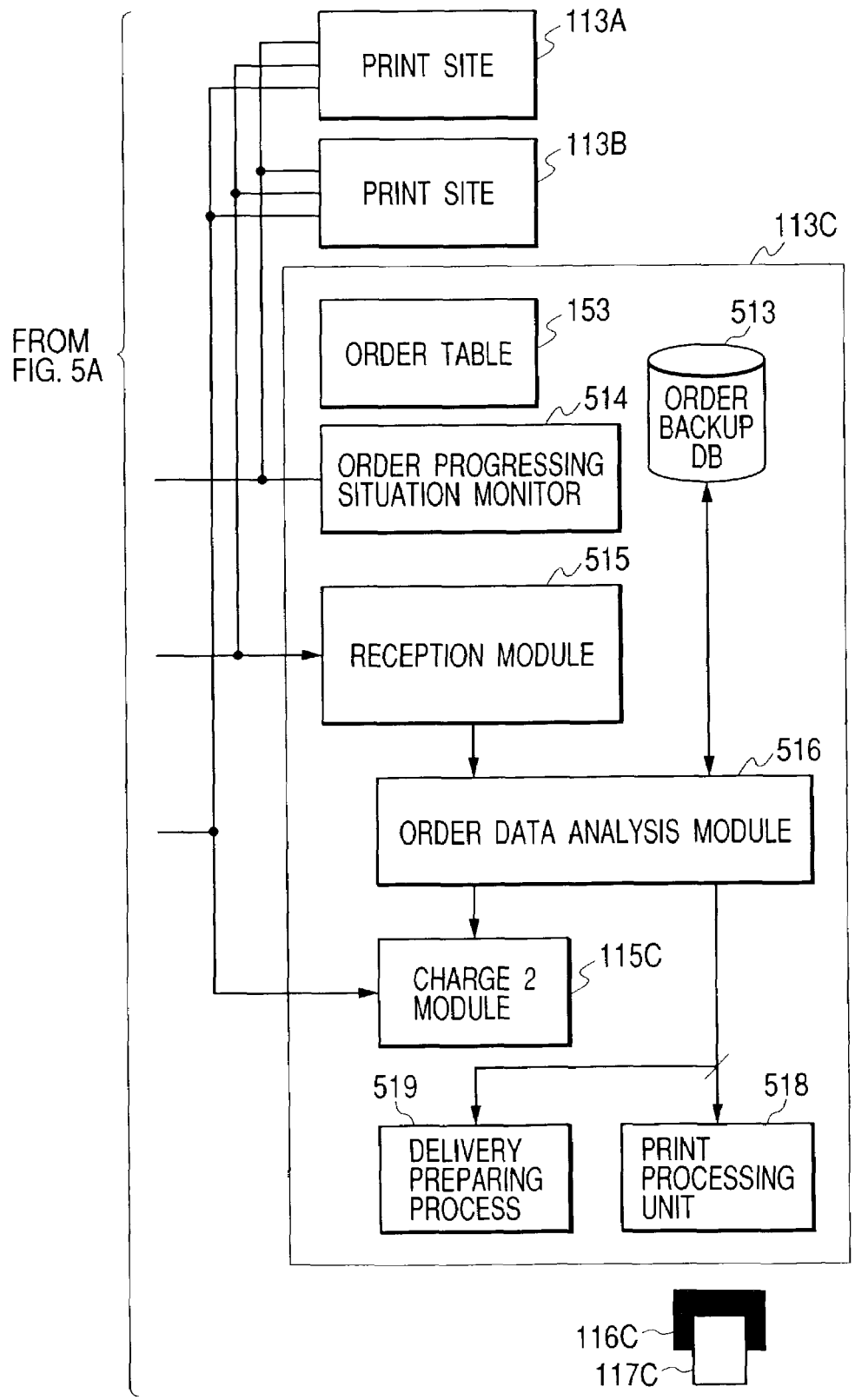

FIGS. 5A and 5B are functional module diagrams in the first embodiment of the invention. Each module which will be explained here is made operative mainly by the CPU in the apparatus.

The customer of the user PC 102A accesses the image service site 107 by using a Web browser 510 having a standard protocol which can transfer information via the Internet 106 which operates on the user PC 102A, obtains Web information linked to multimedia information such as images, audio sound, etc. formed by the description language such as HTML, XML, or the like which is managed by the server PC 300 of the image service site 107 by using the standard protocol such as an http protocol or the like, and allows the obtained Web information to be displayed on a window of the Web browser. By this operation, the customer of the user PC 102A can receive the service, as a communication infrastructure, which is provided by the image service site 107 via the Internet 106.

First, the image service site 107 accessed from the customer of the user PC 102A requests the customer of the user PC 102A to input a unique authentication ID (also called user ID information) such as a login password or the like which has already been issued via the Web browser 510. When the authentication ID coincides, the user of the user PC 102A can receive the service which is provided by the image service site. A module which executes the series of operations is an authentication module 500. The user ID information as an authentication ID which is sent from the customer of the user PC 102A includes a user ID and a password and is collated with reference to the customer attribute information in which their correspondence relations have been registered in the information database 109.

The image data photographed by the image input apparatus 100 is transferred via the data transfer interface 101 to a memory area of the information storing apparatus represented by the HDD of the user PC 102A by a driver module 512 (corresponding to a digital camera driver or a scanner driver) of the user PC 102A. The image data transferred to the user PC 102A is transferred to the image service site 107 via the Internet 106 by an image communication module 511 in an interlocking relational manner with the Web browser 510 by using a file transfer protocol such as an FTP or the like. A module which controls the series of processes on the image service site 107 side, negotiates with the image communication module 511, and receives the image data which is transmitted from the image communication module 511 is an image data reception module 501. The image data received by the image data reception module is stored into the image database 108 via a database interface 505 (hereinafter, abbreviated to DBTF). Reference numeral 502 denotes an image data management module for executing management of the image data of the customers stored in the image database 108, for example, a transfer to the print site, a display to the Web browser of the customer, creation of a backup, management of an image erasing period, and the like.

A flow of the print order of the image data which was uploaded and a flow of processes between the modules with respect to the order conversion of the print order as a maximum feature of the invention will now be explained in order.

First, the customer of the user PC 102A confirms the image uploaded by the customer himself on an image browsing picture plane by the Web browser 510 and selects the image to be print-ordered and the print service provider of the ordering destination.

When the print order to designate the image to be print-ordered and the print service provider of the ordering destination is received from the customer, the image service site 107 analyzes the print order and discriminates the print service provider of the ordering destination. The image service site 107 reads out the template information (format information) for the print service provider of the ordering destination from the order table 150 and transfers the template information to the customer of the user PC 102A by the standard protocol such as http or the like as transfer attribute data of the image information (described by HTML) which can be displayed by the Web browser 510 in order to urge the customer to input the print order information according to the format.

When the transfer attribute data which takes into consideration of the format information which is provided by the image service site 107 is displayed onto the Web browser 510 of the user PC 102A, the customer of the user PC 102A inputs the print order information of the item whose input is urged by the transfer attribute data. This information is transferred from the Web browser 510 to the image service site 107 by the standard protocol such as http or the like. The print order information is transferred to a print order reception module 504.

The print order reception module 504 analyzes the print order information received from the user PC 102A as an information processing apparatus of the user and decomposes it into parameters such as print ordering destination, the number of print sheets, and the like which are necessary for the print order. The decomposed information is sent to a print order conversion module 503. The print order conversion module 503 confirms the print ordering destination, reads out a kind of online print service which can be used in the print site to be ordered this time and the shop information of the print shop from the print site database 110, reads out the template information (format information) from the order table 150, and converts it into the print order information according to the format of the ordering destination. After that, for convenience of explanation, a case of requesting the print site 113C to make the print order is presumed and will be explained.

That is, the print order conversion module 503 confirms that the print ordering destination is the print site 113C, reads out the template information of the print site 113C from the order table 150, and converts it into the print order information (print order) according to the format of the print order of the print site 113C of the ordering destination. On the basis of the read-out print order information according to the format, the temporary print order is formed by a print order creation transmitting unit 507. The print order creation transmitting unit 507 reads out the user ID information (user ID and password) for the print site 113C of the ordering destination from the print site database 110, accesses the print site 113C, and performs a login in order to use the online print service. When the login of the online print service of the print site 113C is successful, the print order creation transmitting unit 507 transmits the formed temporary print order to a reception module 515 of the print site 113C. As mentioned above, the image service site 107 proxy-executes user registration to a plurality of print sites 113A to 113C in place of the user. Since the user ID information has been managed, it is sufficient that the user executes only the user registration into the image service site 107. There is an effect such that the management of the user ID information is easy and a burden to the user is reduced. The print order information which is received from the user PC 102A is a common print order in which a value of the print setting or the like is sent as an argument or received in a common format which is specified by the image service site 107. On the other hand, the temporary print order which is formed by the print order creation transmitting unit 507 is an individual print order according to the format of the print order of the print site of the ordering destination.

The temporary print order information transmitted to the print site 113C is confirmed to be the temporary print order by an order data analysis module 516. Information showing the number of orders, a print base point, and the like is transferred to a charge-2 module 115C. On the basis of the information transferred from the order data analysis module 516 the charge-2 module 115C executes an estimating process and sends a result to a charge-1 module 111 of the image service site 107. The charge-1 module 111 sets a price in which a commission which is caused when settlement proxy is requested to the settlement proxy site 118, a service charge in the case where the image service site 107 provides a service to the customer while adding an additional value service, a profit of the image service site 107, and the like are added to en estimated amount of money transferred from the charge-2 module 115C. The charge-1 module 111 notifies the customer of the user PC 102A of estimate information showing the set estimated price. In the case where the print order received from the user PC 102A uses the online print service of each of a plurality of print sites, the print order creation transmitting unit 507 transmits the temporary print order to each of a plurality of target print sites. After the estimated money amount was received from each of the plurality of print sites, the charge-1 module 111 transmits the estimate information showing the estimated price to the user PC 102A. The estimate information includes a list of each estimation for each of a plurality of print service providers or a value obtained by summing up each estimation.

The user PC 102A displays the estimate information notified from the image service site 107 onto the Web browser, thereby allowing the user to determine approval of the purchase by the estimated price. When an approve button (not shown) displayed on the Web browser 510 is pressed, the user PC 102 notifies the image service site 107 of an instruction indicative of the approval of the purchase. In response to the approval instruction, in the image service site 107, the print order creation transmitting unit 507 forms formal print order information according to the specification of the format information read out from the order table or forms information showing that the temporary print order information which has already been transmitted to the print site 113C is formal, and transmits the formal print order information or information (including an order ID of the temporary print order) showing that the temporary print order information is formal to the reception module 515 of the print site 113C.

In the print site 113C, the received information showing that the formal print order information or the temporary print order information is formal is analyzed by the order data analysis module 516. By analyzing the formal print order information, the order data analysis module 516 obtains parameters such as designation of a print output destination, the number of print processing sheets, print quality, size of print paper, and the like. If the print output destination is not particularly designated, it is determined that the printing process is executed by a print processing unit 518. If the print shop which is in close association is designated, the formal print order information is transferred to the print shop (not shown) of the print output destination via the Internet. If the print output destination is not designated, the print processing unit 518 receives the parameters such as the number of print processing sheets, print quality, size of print paper, and the like from the order data analysis module 516. The printing process is executed by printing means 116C and printed matter 117C is printed out. With respect to delivery information, the delivery information of a delivery destination is sent from the order data analysis module 516 to a delivery preparing process module 519 on the basis of an analysis result of the formal print order information and a delivery instruction is issued. The printed matter is delivered to the customer of the user PC 102A of the ordering destination by some transporting means. Since a printing process which is executed in the print shop is also similar to that mentioned above, its description is omitted here.

With respect to the settling process, the customer of the user PC 102A notifies the image service site 107 of the decision of the purchase. At a stage where the image service site 107 forms the formal print order information according to the specification of the order table 150 by the print order creation transmitting unit, the image service site 107 requests the settlement proxy site 118 to execute a settlement proxy process. In the settlement proxy site 118, on the basis of the customer information from the image service site 107, a customer approval module 520 refers to the customer information of the user PC 102A in the customer database 119 in which the customer attribute information has been stored. After the approval, a settlement execution module 521 executes a settling process.

Figure 6:
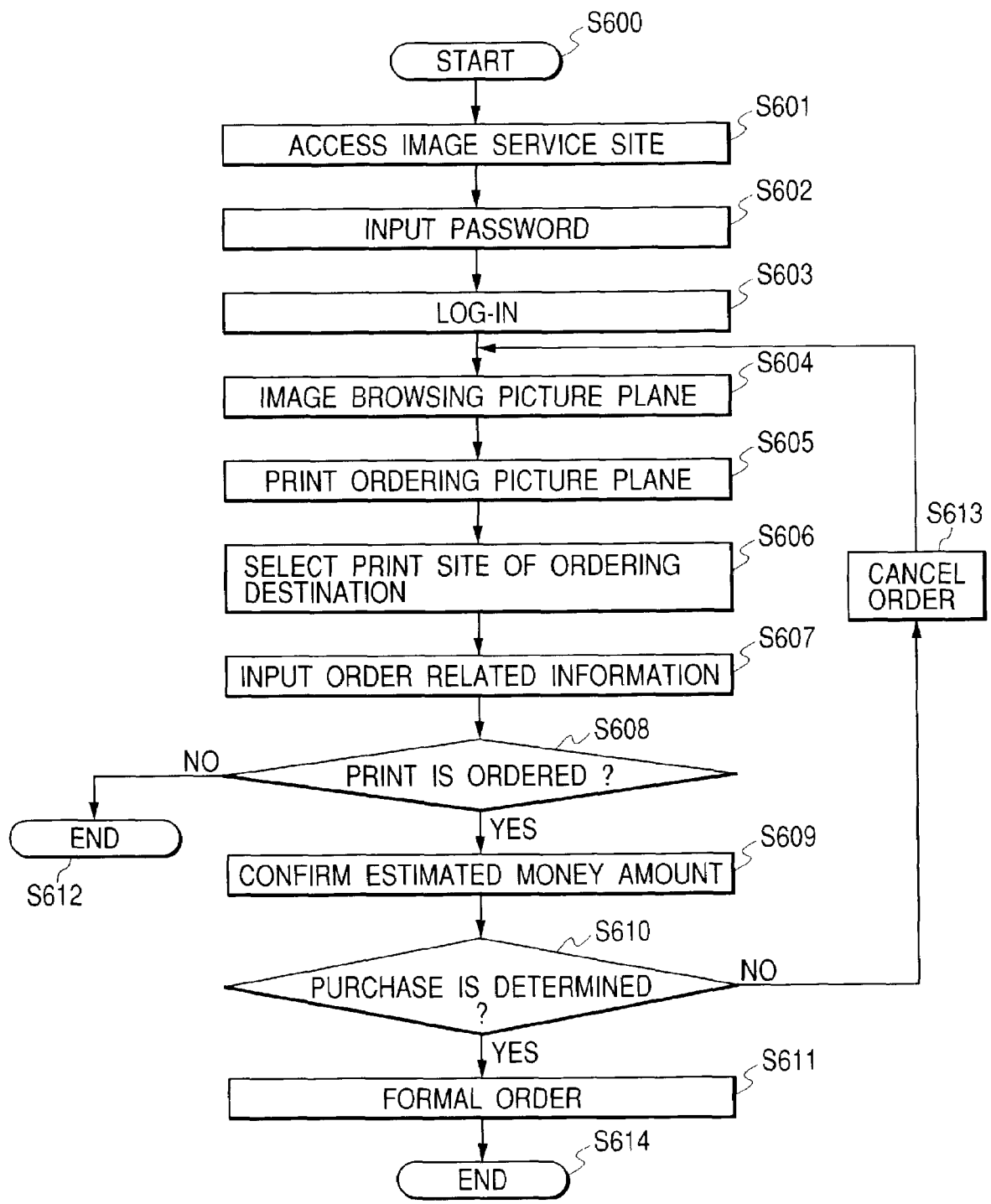
FIG. 6 is a flowchart which is controlled by the user PC of a print ordering process in the embodiment of the invention.

FIG. 6 is a flowchart for the user PC in the print ordering process in the embodiment of the invention. This process is executed by the module in the user PC 102A. Specifically speaking, this process corresponds to the process which is executed by the CPU 216 on the basis of a software module installed in the user PC 102A.

When a process regarding the print order is started in step S600, in order to receive the print service of the image service site 107, the Web browser 510 of the user PC 102A accesses a homepage which is provided by the image service site 107 via the Internet in step S601. In subsequent step S602, the Web browser 510 of the user PC 102A receives picture plane information for urging the user to input the password as an authentication ID mentioned above from the image service site 107 for the purpose of making user authentication, allows a picture plane to be displayed, and requests the user to input the user ID and the password by the user operation. In response to such an inputting request, the customer of the user PC 102A inputs the password.

In step S603, the user ID information comprising the inputted user ID and password is transmitted to the image service site 107. When the user ID information is received, the image service site 107 collates it with the customer attribute information stored in the information database 109, confirms that the user is the authenticated person himself, and permits the login. When the login is authenticated, in step S604, the Web browser obtains the image information described by HTML including the image which has already been uploaded into the image database 108 of the image service site 107 and allows it to be displayed onto the window of the Web browser 510. Subsequently, in step S605, if there is an image to be print-ordered among the browsed images, the customer of the user PC 102A is allowed to select the image and press a print order button, thereby obtaining a print order picture plane from the image service site 107 and allowing it to be displayed. First, in step S606, the Web browser 510 receives an instruction for selecting a print site to make a print order. In step S607, the Web browser 510 obtains the attribute information regarding the selected print site from the image service site 107 and allows the picture plane information including the obtained selected item to be displayed, thereby receiving the input of the information such as print shop, the number of print sheets, article to be printed, print paper size, and the like which are necessary for the print order.

In step S608, the Web browser 510 discriminates whether the print order button (not shown) has been pressed or not. If it is determined that the print order button has been pressed, the processing routine advances to step S609. If it is determined that the print order button is not pressed or a cancel button (not shown) is pressed, the processing routine advances to step S612 and the present print ordering process is finished. In step S609, the Web browser 510 requests the print order by transmitting a print order instruction including the information inputted in step S607 to the image service site 107.

The image service site 107 converts the received print order instruction into the specification of the order format of the print site of the ordering destination by the print order converting process as mentioned above and issues a temporary print order. The print site which received the temporary print order analyzes the temporary print order, calculates an estimated money amount, and notifies the image service site 107 of the calculated memory amount. The image service site 107 which received it transmits estimate information indicative of an estimated price to the user PC 102A in order to confirm whether the customer has a will for purchase by the estimated money amount or not. In step S609, therefore, the Web browser receives the estimate information indicative of the estimated price from the image service site 107 and allows the estimated price to be displayed onto the window. To discriminate whether the customer has determined to buy by this estimated price or not, in step S610, the Web browser 510 discriminates whether a button (not shown) indicative of the approval of the decision of the purchase has been pressed or not. If the purchase approval button is pressed, the processing routine advances to step S611. If the approval decision button is not pressed but the cancel button is pressed, the processing routine advances to step S613.

In step S611, the Web browser transmits information indicative of the approval of the estimated price to the image service site 107, thereby requesting a formal order. In step S614, the print ordering process is finished. If the cancel button is pressed, in step S613, the Web browser 510 notifies the image service site of the cancellation of the purchase. The processing routine is returned to step S604. The approval instruction is a process which is executed on the Web browser 510 by clicking once. By the approval instruction of one click, the print can be ordered to one or a plurality of print sites. It is convenient for the user.

Figure 7:
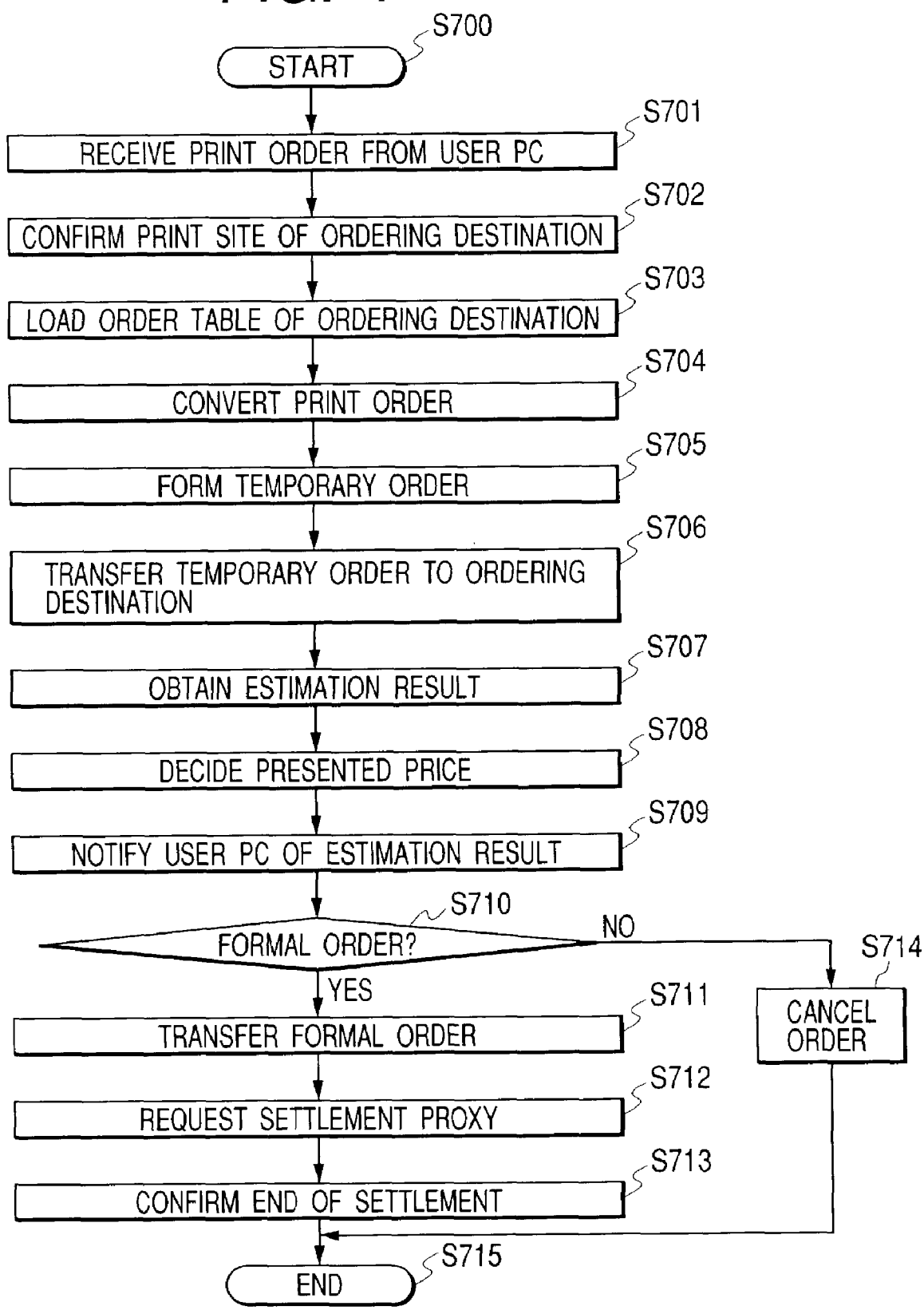
FIG. 7 is a flowchart which is controlled by the server PC of the image service site of the print ordering process in the embodiment of the invention.

FIG. 7 is a flowchart on the image service site PC side in the print ordering process in the first embodiment of the invention. This process is executed by the module in the server PC of the image service site 107. Specifically speaking, this process corresponds to the process which is executed by the CPU 302 on the basis of a software module installed in the server PC of the image service site 107.

When the print ordering process of the image service site 107 is started, the user ID information is received from the user PC 102A and the login process in the present processing routine is executed in step S700. When the login process of the user is executed, the forming process of the display image of the upload image, the discriminating process of the designated print site, and the like are executed as mentioned above. In step S701, the image service site 107 receives print order information (also called print ordering information) according to the specification of the order table transmitted from the user PC 102A. The received print order information is analyzed by the print order reception module 504 in FIGS. 5A and 5B and the information necessary for the print order is extracted. In step S702, the image service site 107 discriminates the information of the print site of the ordering destination from the extracted information regarding the print order.

In step S703, the order table (template information) for print order of the print site of the ordering destination confirmed in step S702 is read out from the order table 150 in FIGS. 5A and 5B. In step S704, the image service site 107 converts the print order information into a print order of the ordering destination on the basis of a format of the read-out template information of the ordering destination. In step S704, the print ordering information from the user PC 102A is analyzed. If it is determined that the online print service to a plurality of print sites is used, the print ordering information is converted into a print order to each print site.

In step S705, the image service site 107 forms one or a plurality of temporary print orders on the basis of such information in order to calculate the estimated amount of money of the purchase price. In step S706, the image service site 107 reads out the user ID information (user ID and password) for the print site(s) of one or a plurality of ordering destinations which is/are designated by the print ordering information from the user PC 102A from the print site database 110, accesses one or a plurality of print sites, and performs the login in order to use the online print service. When the login of the online print service of the print site is successful, the image service site 107 transmits the temporary print order(s) to one or a plurality of print sites of the ordering destination(s). The print site of the ordering destination which received the temporary print order analyzes contents of the temporary print order, calculates an estimated money amount of a fee regarding the print order, and transmits it to the image service site 107.

In step S707, the image service site 107 receives the information of the estimated money amount from one or a plurality of print sites designated by the print order and adds other fees such as expense account, charges for additional value service, profit, and the like to the estimated fee from one or a plurality of ordering destinations. In step S708, an estimated price to be presented to the customer is determined and estimate information indicative of the estimated price is formed. As mentioned above, the estimate information which is formed here is either list display information of the estimated price and the additional price of each print site or total price information indicative of a total price of the estimated price and the additional price of each print site. In step S709, the image service site 107 transmits the estimate information formed in step S708 to the user PC 102A of the ordering source. The customer of the user PC 102A is notified of the estimate information. As mentioned above, when the customer of the user PC 102A determines to buy by the presented price, he notifies the image service site 107 of an approval instruction indicative of a formal ordering action. When the purchase is cancelled, the image service site 107 is notified of a cancel instruction to cancel the order.

In step S710, whether the instruction notified by the user PC 102A is the instruction of the formal order or the instruction to cancel the order is discriminated. In case of the instruction of the formal order, the processing routine advances to step S711. In case of the instruction to cancel the order, the processing routine advances to step S714.

In step S711, the image service site 107 transmits the formal print order or information indicating that the temporary print order which has already been transmitted is the formal print order to the print site(s) of one or a plurality of ordering destinations. In step S714, the image service site 107 requests the print site of the ordering destination to cancel the print order regarding the present print order. After the cancellation of the print order is confirmed, the processing routine is finished in step S715.

In step S711, after the formal print order was issued, in step S712, the image service site 107 requests the settlement proxy site 118 to execute settlement proxy of the fee regarding the print order which should be paid by the customer. The settlement proxy site 118 which received such a request executes a settling process and notifies the image service site 107 of the completion of the settling process. In step S713, when the image service site 107 confirms the notification of the completion of settlement, the processing routine is finished in step S715.

Figure 8:
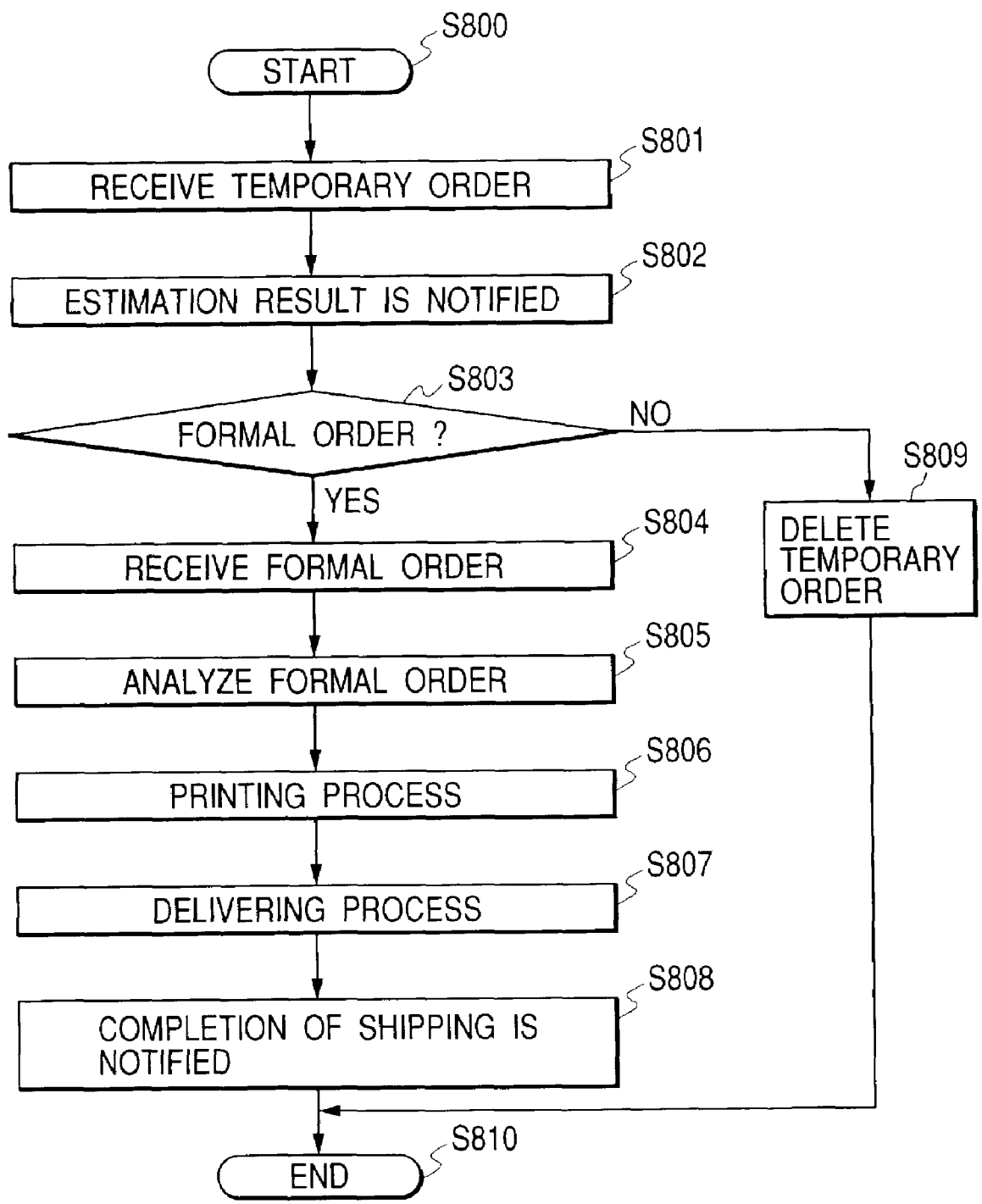
FIG. 8 is a flowchart which is controlled by a print site of the print ordering process in the embodiment of the invention.

FIG. 8 is a flowchart on the print site side in the print ordering process in the embodiment of the invention. This process corresponds to the process which is executed by the module in the server PC of the print site 113. Specifically speaking, this process corresponds to the process which is executed by the CPU 402 on the basis of a software module installed in the server PC of the print site 113.

In step S800, when the login for using the online print service is requested to the print site 113 by the image service site 107, the print site 113 receives the user ID information from the image service site 107, refers to a customer database (not shown), and makes user authentication. If the login process is executed as a result of the user authentication, in step S801, the print site 113 receives the temporary print order for the estimating process according to the order specification of the print site which is sent from the image service site 107. The print site which received the temporary print order analyzes the information of the temporary print order, calculates the charge for the present print order from the analyzed information, and determines an estimated price. In step S802, the print site 113 notifies the image service site 107 of a result of the estimated price. As mentioned above, the customer of the user PC 102A is notified of this result by the image service site 107 and allowed to select whether the print is formally ordered or cancelled. The image service site 107 notifies the print site 113 of a selection result. In step S803, the print site 113 receives this result from the image service site and discriminates whether the print is formally ordered or cancelled. In case of the formal order, the processing routine advances to step S804. In case of cancelling, the processing routine advances to step S809.

In case of cancelling, in step S809, the print site 113 deletes the temporary print order received for estimation. The processing routine is finished in step S810. In case of the formal order, in step S804, the print site 113 receives the formal print order according to the specification of the order table of this print site or the information showing that the temporary print order which has already been received is the formal print order from the image service site 107. In step S805, the print site 113 extracts the print order information such as designation of the print shop of the ordering destination, article form, the number of order sheets, and the like. In step S806, the printing process of the requested print order is executed. Specifically speaking, in the information extracted in step S805, if the designation information of the print shop designates an external print shop, the formal print order is transferred to the print shop (not shown) via the Internet. If the designation information of the print shop designates a printing apparatus in the print site 113 or the print shop is not particularly designated, the printing process is executed by using the print processing unit 518 as mentioned above. At a point when the print is finished, in step S807, in order to deliver the printed article to the customer of the user PC 102A, a slip on which an address of a delivery destination has been written is printed and a print completion flag is set to the high level, thereby executing a delivery control process. A delivery process of the printed matter is executed by an employee of the print site. When the delivery control process as a printing process of the slip is finished and the printed article is shipped, the employee presses a delivery completion button (not shown). In step S808, if the print site 113 determines that the delivery completion button has been pressed, the image service site 107 is notified of shipping completion information. The processing routine is finished in step S810.

Figure 9:
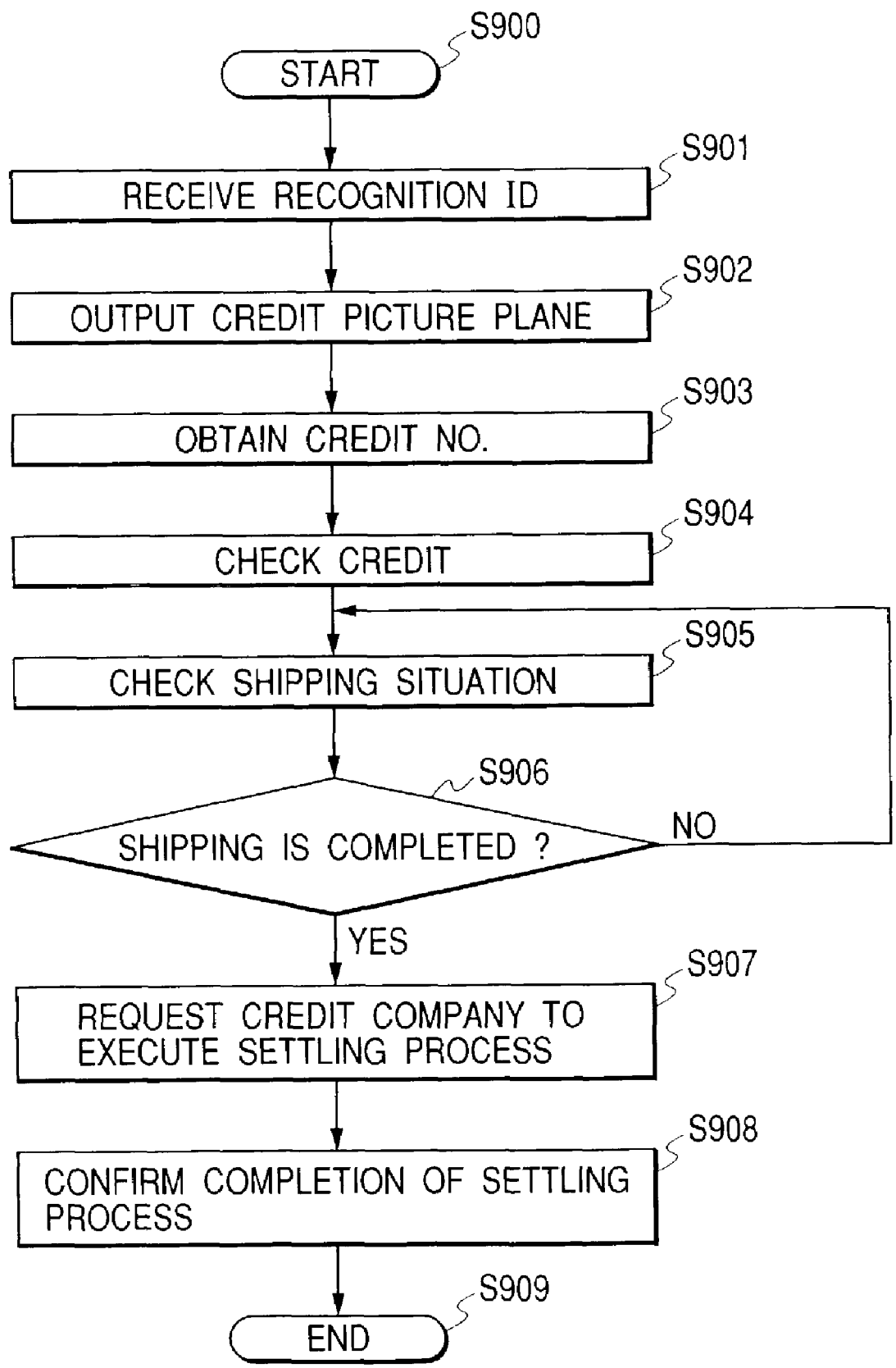
FIG. 9 is a flowchart which is controlled by the settlement proxy site in the print ordering process in the embodiment of the invention.

FIG. 9 is a flowchart for the settlement proxy site in the print ordering process in the embodiment of the invention. This process is executed by the module in the server PC of the settlement proxy site 118. Specifically speaking, this process corresponds to the process which is executed by the CPU 352 on the basis of a software module installed in the server PC of the settlement proxy site 118.

In step S900, if the settlement proxy site 118 is notified of the presence of the request for the settlement proxy by the image service site 107, first, in step S901, the settlement proxy site 118 receives an authentication ID of the customer who executes the settling process from the image service site 107 and collates with the authentication ID, thereby executing an approval process. For the authenticated customer, in order to execute the subsequent settling process, in step S902, the settlement proxy site 118 presents a GUT (corresponding to the picture plane information described by HTML) for inputting a credit number to the customer of the user PC 102A. The settlement proxy site 118 obtains the credit number of the customer inputted to the GUI for inputting the credit number in step S903.

On the basis of the credit number, in step S904, the settlement proxy site 118 inquires of a credit company which plays a role of an actual money dealing process to thereby confirm that the customer of the user PC 102A has solvency of the fee. In step S905, the settlement proxy site 118 checks a shipping situation of the ordered article in the print site. In step S906, the settlement proxy site 118 discriminates the completion of the shipping. If the article is not shipped yet, the processing routine is branched to "No" and the checking process of the shipping situation in step S905 is executed again. If the shipping is completed, in step S907, the settlement proxy site 118 instructs the credit company to execute the settling process. In step S908, the completion of the settling process is confirmed. The settling process is finished in step S909.

Another embodiment of the invention will now be described. According to this embodiment, the common template information to the image service site 107 is held in the user PC 102A. In case of ordering the print from the user PC 102A, print ordering information is formed on the basis of the template information (format information) held in the user PC 102A. In the image service site 107, consequently, in case of ordering the print from the user PC 102A, there is no need to execute processes for reading out the template information suitable for the selected print site and transmitting it to the Web browser by the picture plane information in which necessary set items have been described by HTML.

A fundamental system construction to realize the second embodiment is similar to that of FIG. 1 in the first embodiment and its description is omitted here. Hardware constructions of the user PC, the server PC of the image service site 107, the server PC of the print site, and the server PC of the settlement proxy site constructing the system are also similar to those of FIGS. 2, 3, and 4 and their descriptions are omitted here.

Figure 10:
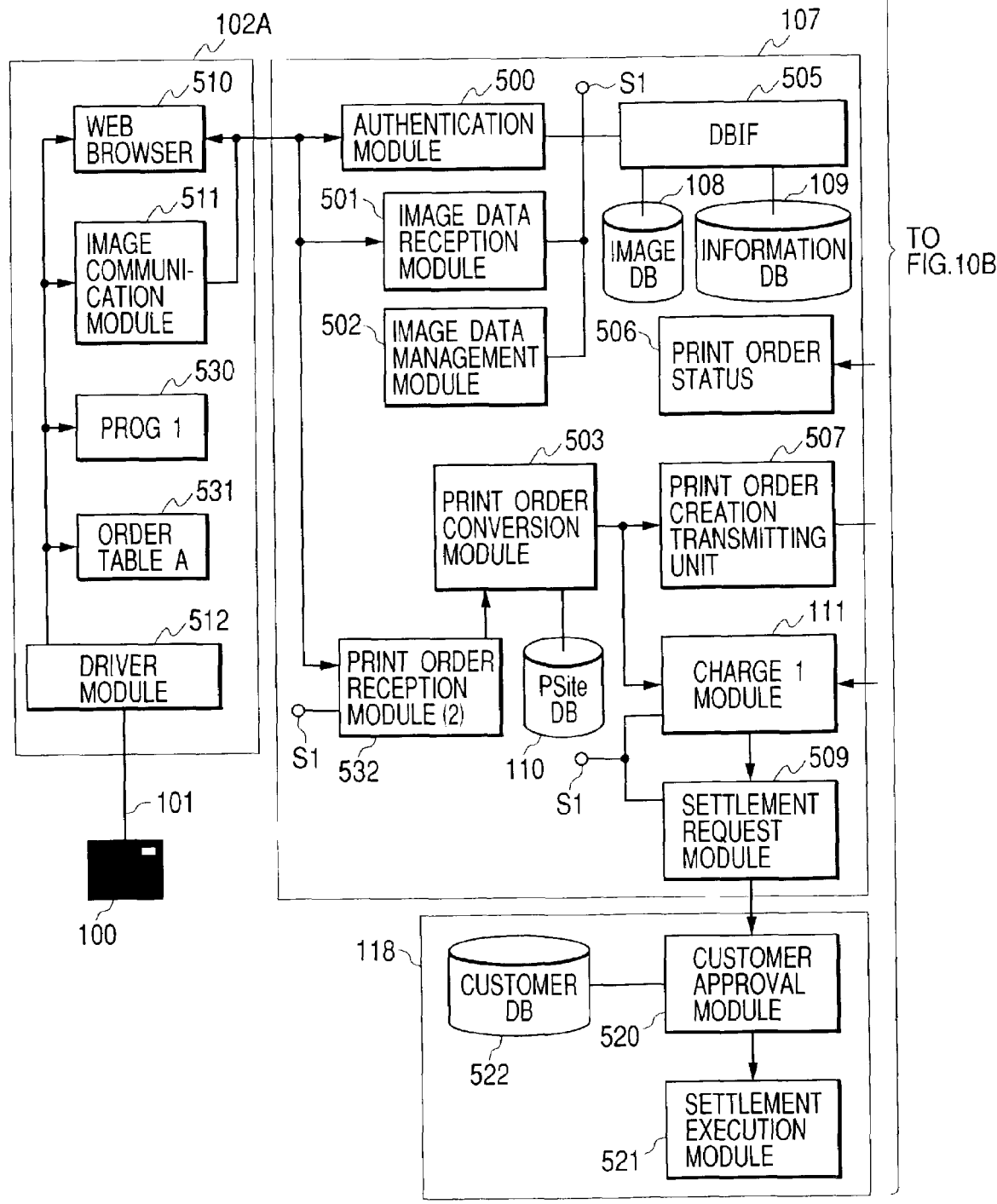
FIG. 10 which is composed of FIGS. 10A and 10B are functional module diagrams in another embodiment of the invention.
Figure 10B:
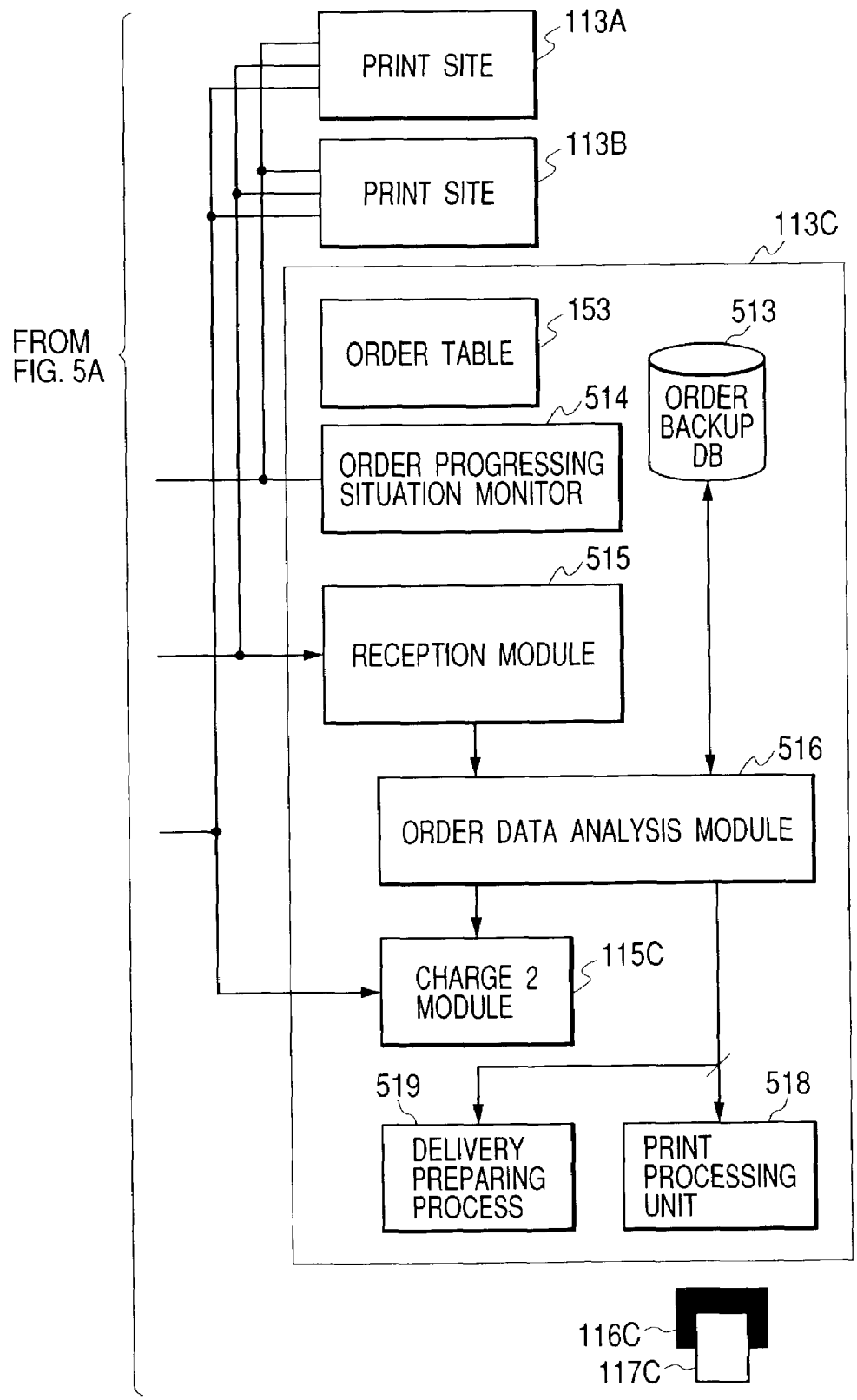

FIGS. 10A and 10B are functional module diagrams in the second embodiment of the invention. In FIGS. 10A and 10B, the same portions as those in FIGS. 5A and 5B as a functional module diagram in the first embodiment are designated by the same reference numerals and they provide the same functions. Attention is now paid to new characteristic portions and they will be explained here.

A flow of the print order of the uploaded image data and order conversion of the print order which is executed in the user PC and relates to the maximum feature of the second embodiment of the invention will be sequentially explained while tracing a flow of processes between the modules. The customer of the user PC 102A confirms the image uploaded by the customer by himself by the Web browser 510 with reference to the image browsing picture plane and selects an image to be print-ordered.

A dedicated application program which has previously been installed in the user PC 102A or PROG1 530 as a plug-in program for the Web browser receives the information regarding the print order inputted by the customer of the user PC 102A via the Web browser 510, refers to an order table A' 531 stored on the user PC 102A side, and forms print order information data (also referred to as a common print order) according to a specification of the order table A' 531 for the image service site 107. The print order information data is formed in a file format such that a plurality of information necessary for the print orders is managed in the lump. The file regarding the formed print order information is transferred from the Web browser 510 to the image service site 107 by the standard protocol such as http, ftp, or the like. The file of the common print order information is transferred to a print order reception module (2) 532.

The print order reception module (2) 532 receives the common print order information file and analyzes it. The information decomposed into the parameters such as print ordering destination, the number of print sheets, and the like which are necessary for print ordering is sent to the print order conversion module 503. The print order conversion module 503 confirms the print ordering destination, reads out the order table that is used by the print site which makes an order at present from the print site database 110, and converts it into print order information according to the specification of the order table of the ordering destination. After that, the actual ordering process to the print site, the settlement proxy requesting process, and the like are similar to those described in FIGS. 5A and 5B as a functional module diagram in the first embodiment and their descriptions are omitted here.

FIG. 11 is a flowchart for the user PC in the print ordering process in the second embodiment of the invention. In FIG. 11, the same portions as those in FIG. 6 explaining the print ordering process in the first embodiment are designated by the same reference numerals and they provide the same functions. Attention is now paid to new characteristic portions and they will be explained here. This process is executed by the module in the user PC 102A. Specifically speaking, this process corresponds to the process which is executed by the CPU 216 on the basis of a software module installed in the user PC 102A.

Since processes of the user PC in steps S1100 to S1106 are similar to those in FIG. 6, their descriptions are omitted here. However, a process of the image service site 107 corresponding to the process of the user PC 102A slightly differs. Specifically speaking, in step S1106, after the user PC 102A selected the print site, the image service site 107 reads out the template information of the selected print site and transmits it to the user PC 102A. In the second embodiment, however, such a process is not executed but only the transmission of shop information of the print shop which is in close association with the selected print site from the print site database 110 is executed.

In step S1107, the Web browser 510 inputs the information such as designation of the print shop, the number of print sheets, article to be printed, and the like necessary for print ordering. In step S1108, the Web browser 510 discriminates whether the print order has been instructed or not.

If the print order is not made, the processing routine advances to step S1114. In case of making the print order, in step S1109, the common print order information according to the specification of the image service site 107 is formed as an order file with reference to the order table A' 531 which has already been stored in the user PC 102A, and this order file is transferred. In the image service site 107 receives this order file, converts it into the specification of the order format of the print site of the ordering destination by the print order converting process as mentioned above, and issues the temporary print order.

In a manner similar to the foregoing embodiment, the print site which received the temporary print order analyzes the temporary print order, calculates an estimated amount of money, and notifies the image service site 107 of the estimated money amount. The image service site 107 which received the estimated money amount sends the information to the user PC 102A in order to confirm whether the customer has a will for purchase by the estimated money amount or not. In accordance with such information, in step S1110, a confirming process of the estimated money amount is executed in the user PC 102A. Since this process and subsequent processes are similar to those shown in FIG. 6, their descriptions are omitted here.

As described above in the embodiment, in the ordering process such that the customer requests the print site to make the print order via the image service site, the PC which is used by the customer to access the image service site is requested to input the print order information according to the specification of the print order table managed in the image service site, the print ordering information according to the print order information is received and converted into the print order information of the print site of the ordering destination in the image service site. Thus, the customer who makes an order does not need to learn the specification of each print order table of a plurality of print sites nor to individually input the ordering information. The print order can be made by the input of the print order information according to the specification of one order table.

As described in the second embodiment of the invention, in the ordering process such that the customer requests the print site to make the print order via the image service site, the PC which is used when the customer accesses the image service site has the print order table which is provided by the image service site. On the basis of this information, the file of the print order information regarding the print order of the customer is formed and transferred to the image service site. In the image service site, the file is converted into the print order information of the print site of the ordering destination. Thus, in the PC of the customer, there is no need to have the order table information of a plurality of print sites. Merely by having one order table information which is provided by the image service site, the print order in one order table can be issued to any print site so long as it is a print site which can convert the orders in the image service site.

As many apparently widely different embodiments of the present invention can be made without departing from the spirit and scope thereof, it is to be understood that the invention is not limited to the specific embodiments thereof except as defined in the appended claims.

As described above, according to the invention, in the print control system for forming the print orders to the print service providers which provide the online print service via the Internet, the format information of each of the print orders to a plurality of print service providers is managed and, in the case where the print order is received from the user via the Internet, the print order according to the print service provider of the ordering destination is formed on the basis of the format information for the print service provider of the ordering destination of the print order. Therefore, effects such that in the case where the user used a plurality of print sites, a burden of the operation to the user and a burden of the costs are reduced, and using efficiency of the online print service is improved are obtained.

According to the invention, in the print control system for forming the print orders to the print service providers which provide the online print service via the Internet, the user identification information to a plurality of print service providers is managed and, in the case where the print order is received from the user via the Internet, the print service provider of the ordering destination is accessed by using the user identification information of the print service provider of the ordering destination of the print order. Therefore, it is sufficient that the client PC of the user accesses one image service site. An effect such that the print order can be made to a plurality of print service providers without accessing the plurality of print service providers is obtained.

According to the invention, in the print control method of forming the print orders to the print service providers which provide the online print service via the Internet, the estimate information of the print orders to a plurality of print service providers is transmitted to the information processing apparatus of the user via the Internet and, in accordance with the reception of the instruction showing the approval of estimation of the print orders to the plurality of print service providers transmitted from the information processing apparatus of the user, the print orders are issued to the plurality of print service providers. Therefore, it is sufficient that the client PC of the user accesses one image service site. An effect such that the print orders can be made to a plurality of print service providers without accessing the plurality of print service providers is obtained.

What is claimed is:

1. An image service apparatus that communicates with a user terminal apparatus and a plurality of print service providing apparatuses via a network, wherein said image service apparatus communicates with said user terminal apparatus if said image service apparatus authenticates a login of a user of said user terminal apparatus, comprising:

selection receiving unit that receives, from said user terminal apparatus, attribute information uniquely specifying one of the plurality of print service providing apparatuses selected by a user of said user terminal apparatus;

order receiving unit that receives first print order information, including a plurality of print parameters, and attribute information, from said user terminal apparatus, wherein the first print order information is input in accordance with a first template which is common to each of the plurality of print service providing apparatuses and includes a selection item, which is necessary for the first print order information with respect to the selected print service providing apparatus;

print site managing unit that manages a plurality of second templates and a plurality of user identification information for the authenticated user, each user identification of the authenticated user corresponding respectively to one of the plurality of print service providing apparatuses, wherein the plurality of second templates are different from each other, respectively;

extracting unit that extracts the attribute information from the first order information received by said order receiving unit;

selecting unit that selects the second template corresponding to the print service providing apparatus specified by the attribute information extracted by said extraction unit, from among the plurality of second templates managed by said print site managing unit;

converting unit that converts the print parameters of the first print order information to second print order information, which is suited to the specified print service providing apparatus, based on the second template selected by said selecting unit; and transmitting unit that accesses the specified print service providing apparatus by using the user identification information corresponding to the specific print service providing apparatus among the plurality of user identification information of the user, managed by said print site managing unit and transmits the second print order information to the specified print service providing apparatus, whereby the specified print service providing apparatus prints out an image based on the transmitted second print order information.

2. The apparatus according to claim 1, further comprising:

image receiving unit that receives image data from said user terminal apparatus;

storing unit that stores the received image data; and image transmitting unit that transmits the received image data to said specified print service providing apparatus, wherein the specified print service providing apparatus subjects the image data to print processing based on the second print order information.

3. The apparatus according to claim 1, further comprising:

user transmitting unit that transmits the user identification information to said specified print service providing apparatus, wherein, said order transmitting unit transmits the second print order information to said specified print service providing apparatus if said specified print service providing apparatus authenticates the user identification information.

4. The apparatus according to claim 1, wherein the first print order information further includes at least one of a receiver of an order and the number of prints.

5. A control method executed in an image service apparatus that communicates with a user terminal apparatus and a plurality of print service providing apparatuses via a network, wherein said image service apparatus communicates with said user terminal apparatus if said image service apparatus authenticates a login of a user of said user terminal apparatus, comprising:

selection receiving step of receiving, from said user terminal apparatus, attribute information uniquely specifying one of the plurality of print service providing apparatuses selected by a user of said user terminal apparatus;

an order receiving step of receiving first print order information, including a plurality of print parameters and attribute information, from said user terminal apparatus, wherein the first print order information is input in accordance with a first template which is common to each of the plurality of print service providing apparatuses and includes a selection item, which is necessary for the first print order information with respect to the selected print service providing apparatus;

a print site managing step of managing a plurality of second templates and a plurality of user identification information for the authenticated, each user identification of the authenticated user corresponding respectively to one of the plurality of print service providing apparatuses, wherein the plurality of second templates are different from each other, respectively;

an extracting step of extracting the attribute information from the first order information received in said order receiving step;

a selecting step of selecting the second template corresponding to the print service providing apparatus specified by the attribute information extracted in said extracting step, from among the plurality of second templates managed in said print site managing step;

a converting step of convening the print parameters of the first print order information to second print order information, which is suited to the specified print service providing apparatus, based on the second template selected in said selecting step; and a transmitting step of accessing the specified print service providing apparatus by using the user identification information corresponding to the specific print service providing apparatus among the plurality of user identification information of the user, managed in said print site managing step and transmitting the second print order information to the specified print service providing apparatus, whereby the specified print service providing apparatus prints out an image based on the transmitted second print order information.

6. A computer-readable storage medium on which is stored a computer-executable program for executing a method by an image service apparatus that communicates with a user terminal apparatus and a plurality of print service providing apparatuses via a network, wherein said image service apparatus communicates with said user terminal apparatus if said image service apparatus authenticates login of a user of said user terminal apparatus, said method comprising:

a selection receiving step of receiving, from said user terminal apparatus, attribute information uniquely specifying one of the plurality of print service providing apparatuses selected by a user of said user terminal apparatus;

an order receiving step of receiving first print order information, including a plurality of print parameters, and attribute information, from said user terminal apparatus, wherein the first print order information is input in accordance with a first template which is common to each of the plurality of print service providing apparatuses and includes a selection item, which is necessary for the first print order information with respect to the selected print service providing apparatus;

a print site managing step of managing a plurality of second templates and a plurality of user identification information for the authenticated user, each user identification of the authenticated user coresponding respectively to one of the plurality of print service providing apparatuses, wherein the plurality of second templates are different from each other, respectively;

an extracting step of extracting the attribute information from the first order information received in said order receiving step;

a selecting step of selecting the second template corresponding to the print service providing apparatus specified by the attribute information extracted in said extracting step, from among the plurality of second templates managed in said print site managing step;

a converting step of convening the print parameters of the first print order information to second print order information, which is suited to the specified print service providing apparatus, based on the second template selected in said selecting step; and a transmitting step of accessing the specified print service providing apparatus by using the user identification information corresponding to the specific print service providing apparatus among the plurality of user identification information of the user, managed in said print site managing step and transmitting the second print order information to the specified print service providing apparatus, whereby the specified print service providing apparatus prints out an image based on the transmitted second print order information.

* * * * *